US012176974B2

(12) United States Patent
Zhang et al.

(10) Patent No.: US 12,176,974 B2
(45) Date of Patent: *Dec. 24, 2024

(54) GENERATING AND PROCESSING MULTI-USER DATA UNITS FOR WLAN

(71) Applicant: HUAWEI TECHNOLOGIES CO., LTD., Shenzhen (CN)

(72) Inventors: Hongyuan Zhang, Fremont, CA (US); Raja Banerjea, Sunnyvale, CA (US); Yong Liu, Campbell, CA (US); Mao Yu, San Jose, CA (US)

(73) Assignee: Huawei Technologies Co., Ltd, Shenzhen (CN)

( * ) Notice: Subject to any disclaimer, the term of this patent is extended or adjusted under 35 U.S.C. 154(b) by 344 days.

This patent is subject to a terminal disclaimer.

(21) Appl. No.: 16/904,148

(22) Filed: Jun. 17, 2020

(65) Prior Publication Data
US 2020/0322005 A1    Oct. 8, 2020

Related U.S. Application Data

(63) Continuation of application No. 15/063,218, filed on Mar. 7, 2016, now Pat. No. 10,693,533, which is a
(Continued)

(51) Int. Cl.
*H04B 7/0452*    (2017.01)
*H04B 7/0413*    (2017.01)
(Continued)

(52) U.S. Cl.
CPC ......... *H04B 7/0452* (2013.01); *H04B 7/0413* (2013.01); *H04B 7/0669* (2013.01);
(Continued)

(58) Field of Classification Search
None
See application file for complete search history.

(56) References Cited

U.S. PATENT DOCUMENTS 6,912,249 B2    6/2005 Haartsen
7,110,350 B2    9/2006 Li et al.
(Continued)

FOREIGN PATENT DOCUMENTS

CN    1918818 A    2/2007
CN    101346902 A    1/2009
(Continued)

OTHER PUBLICATIONS

Gross et al., "Multi-User OFDMA Frame Aggregation for Future Wireless Local Area Networking," In Proc. of IFIP Networking 2009, Aachen, Germany, pp. 1-12 (May 2009).
(Continued)

*Primary Examiner* — Gregory B Sefcheck
*Assistant Examiner* — Suk Jin Kang
(74) *Attorney, Agent, or Firm* — Leydig, Voit & Mayer, Ltd.

(57) ABSTRACT

A first field of a preamble includes a plurality of indications of respective numbers of spatial or space-time streams for respective receivers to enable each receiver among the multiple receivers to determine a respective set of one or more training sequences, in a plurality of training sequences, that corresponds to the receiver. A second field of the preamble includes respective modulation and coding scheme information for the respective receivers. The preamble is generated such that i) the first field is transmitted prior to the plurality of training sequences, and ii) the second field of the preamble is transmitted after the plurality of training sequences are transmitted. A data portion of the multi-user data unit is generated using respective modulation and coding schemes for the respective receivers. Thee multi-user data unit is transmitted such that data for the respective receivers are transmitted via respective sets of one or more spatial or space-time streams.

16 Claims, 21 Drawing Sheets

Related U.S. Application Data continuation of application No. 14/269,976, filed on May 5, 2014, now Pat. No. 9,281,877, which is a continuation of application No. 12/910,628, filed on Oct. 22, 2010, now Pat. No. 8,724,546.

(60) Provisional application No. 61/321,390, filed on Apr. 6, 2010, provisional application No. 61/307,780, filed on Feb. 24, 2010, provisional application No. 61/294,729, filed on Jan. 13, 2010, provisional application No. 61/260,729, filed on Nov. 12, 2009, provisional application No. 61/259,584, filed on Nov. 9, 2009, provisional application No. 61/255,038, filed on Oct. 26, 2009, provisional application No. 61/254,608, filed on Oct. 23, 2009.

(51) Int. Cl.
*H04B 7/06* (2006.01)
*H04L 5/00* (2006.01)
*H04L 25/02* (2006.01)
*H04W 84/12* (2009.01)

(52) U.S. Cl.
CPC .......... *H04L 5/0023* (2013.01); *H04L 5/0048* (2013.01); *H04L 5/005* (2013.01); *H04L 5/0053* (2013.01); *H04L 25/0226* (2013.01); *H04W 84/12* (2013.01)

(56) References Cited

U.S. PATENT DOCUMENTS

| | | | |
|---|---|---|---|
| 8,144,647 B2 | 3/2012 | Nabar et al. | |
| 8,149,811 B2 | 4/2012 | Nabar et al. | |
| 8,270,909 B2 | 9/2012 | Zhang et al. | |
| 8,351,533 B2 | 1/2013 | Shrivastava et al. | |
| 8,472,383 B1 | 6/2013 | Banerjea et al. | |
| 8,532,221 B2 | 9/2013 | Liu et al. | |
| 8,665,906 B1 | 3/2014 | Liu et al. | |
| 8,681,757 B2 | 3/2014 | Lee et al. | |
| 8,681,815 B1 | 3/2014 | Liu et al. | |
| 8,724,546 B2 | 5/2014 | Zhang et al. | |
| 8,891,666 B2 | 11/2014 | Lee et al. | |
| 9,281,877 B2 | 3/2016 | Zhang et al. | |
| 9,294,164 B2 | 3/2016 | Zhang et al. | |
| 9,480,018 B2 | 10/2016 | Liu et al. | |
| 9,736,731 B1 | 8/2017 | Liu et al. | |
| 2005/0025080 A1 | 2/2005 | Liu | |
| 2005/0043027 A1 | 2/2005 | Emeott et al. | |
| 2005/0276347 A1* | 12/2005 | Mujtaba | H04B 7/0684 375/267 |
| 2005/0286474 A1 | 12/2005 | van Zelst et al. | |
| 2006/0045035 A1 | 3/2006 | Liu | |
| 2006/0093066 A1 | 5/2006 | Jeong et al. | |
| 2006/0140303 A1 | 6/2006 | Egashira et al. | |
| 2006/0182017 A1 | 8/2006 | Hansen et al. | |
| 2006/0252433 A1 | 11/2006 | Rothschild | |
| 2006/0252443 A1 | 11/2006 | Sammour et al. | |
| 2007/0025392 A1 | 2/2007 | Moorti et al. | |
| 2007/0047666 A1 | 3/2007 | Trachewsky | |
| 2007/0058566 A1 | 3/2007 | Frederiks et al. | |
| 2007/0097930 A1 | 5/2007 | Ouyang et al. | |
| 2007/0104089 A1 | 5/2007 | Mujtaba | |
| 2007/0183541 A1 | 8/2007 | Moorti et al. | |
| 2007/0206504 A1 | 9/2007 | Koo et al. | |
| 2007/0230403 A1 | 10/2007 | Douglas et al. | |
| 2007/0258536 A1 | 11/2007 | Kim et al. | |
| 2007/0275671 A1 | 11/2007 | Hwang et al. | |
| 2008/0031191 A1 | 2/2008 | Kashima et al. | |
| 2008/0095091 A1 | 4/2008 | Surineni et al. | |
| 2009/0022128 A1 | 1/2009 | Nabar et al. | |
| 2009/0059831 A1 | 3/2009 | Li et al. | |
| 2009/0196163 A1 | 8/2009 | Du | |
| 2009/0252110 A1 | 10/2009 | Sridhara et al. | |
| 2010/0046358 A1 | 2/2010 | Van Nee | |
| 2010/0046656 A1 | 2/2010 | Van Nee et al. | |
| 2010/0080173 A1 | 4/2010 | Takagi | |
| 2010/0165907 A1 | 7/2010 | Chu et al. | |
| 2010/0248635 A1 | 9/2010 | Zhang et al. | |
| 2010/0260138 A1 | 10/2010 | Liu et al. | |
| 2010/0260159 A1* | 10/2010 | Zhang | H04L 69/18 370/338 |
| 2010/0277368 A1 | 11/2010 | Ponnuswamy | |
| 2010/0290449 A1 | 11/2010 | Van Nee et al. | |
| 2010/0309834 A1* | 12/2010 | Fischer | H04B 7/0452 370/312 |
| 2010/0309848 A1* | 12/2010 | Erceg | H04L 27/2602 375/267 |
| 2010/0309868 A1 | 12/2010 | Yang et al. | |
| 2011/0002219 A1 | 1/2011 | Kim et al. | |
| 2011/0002319 A1 | 1/2011 | Husen et al. | |
| 2011/0032875 A1* | 2/2011 | Erceg | H04L 5/0053 370/328 |
| 2011/0051705 A1 | 3/2011 | Jones, IV et al. | |
| 2011/0063991 A1 | 3/2011 | Sampath et al. | |
| 2011/0064040 A1 | 3/2011 | Kim et al. | |
| 2011/0075607 A1 | 3/2011 | Kim et al. | |
| 2011/0096796 A1 | 4/2011 | Zhang et al. | |
| 2011/0096797 A1 | 4/2011 | Zhang et al. | |
| 2011/0110454 A1 | 5/2011 | Sampath et al. | |
| 2011/0188598 A1 | 8/2011 | Lee et al. | |
| 2011/0194545 A1 | 8/2011 | Yang et al. | |
| 2011/0222490 A1 | 9/2011 | Fischer et al. | |
| 2011/0299382 A1 | 12/2011 | Van Nee et al. | |
| 2012/0127940 A1 | 5/2012 | Lee et al. | |
| 2012/0281774 A1* | 11/2012 | Lee | H04B 7/0456 375/260 |
| 2012/0327862 A1 | 12/2012 | Lee et al. | |
| 2013/0286925 A1 | 10/2013 | Fischer et al. | |
| 2014/0022930 A1 | 1/2014 | Trachewsky et al. | |
| 2014/0078966 A1* | 3/2014 | Erceg | H04B 7/043 370/328 |
| 2014/0140311 A1 | 5/2014 | Lee et al. | |
| 2014/0140312 A1 | 5/2014 | Lee et al. | |
| 2014/0241458 A1 | 8/2014 | Zhang et al. | |
| 2014/0362845 A1 | 12/2014 | Lee et al. | |
| 2015/0009940 A1 | 1/2015 | Liu et al. | |
| 2015/0009979 A1 | 1/2015 | Noh et al. | |
| 2015/0023291 A1 | 1/2015 | Lee et al. | |
| 2015/0063288 A1 | 3/2015 | Yang et al. | |
| 2015/0109948 A1* | 4/2015 | Kim | H04W 72/23 370/252 |
| 2015/0237613 A1 | 8/2015 | Lee et al. | |
| 2015/0341102 A1 | 11/2015 | Erceg et al. | |
| 2016/0308591 A1 | 10/2016 | Lee et al. | |
| 2017/0250785 A1 | 8/2017 | Zhang et al. | |

FOREIGN PATENT DOCUMENTS

| | | |
|---|---|---|
| CN | 102396186 A | 3/2012 |
| EP | 1693972 A2 | 8/2006 |
| EP | 1821477 A2 | 8/2007 |
| JP | 2005277647 A | 10/2005 |
| JP | 2007082189 A | 3/2007 |
| JP | 2008539665 A | 11/2008 |
| KR | 20090082227 A | 7/2009 |
| KR | 20110027539 A | 3/2011 |
| KR | 20110030272 A | 3/2011 |
| WO | 2002076053 A1 | 9/2002 |
| WO | 2006001898 A1 | 1/2006 |
| WO | 2006115999 A2 | 11/2006 |
| WO | 2007032413 A1 | 3/2007 |
| WO | 2008115282 A2 | 9/2008 |
| WO | 2009027931 A2 | 3/2009 |
| WO | 2009109894 A1 | 9/2009 |

(56) References Cited

FOREIGN PATENT DOCUMENTS

| WO | 2011031058 A2 | 3/2011 |
|----|---------------|--------|
| WO | 2011056790 A1 | 5/2011 |

OTHER PUBLICATIONS

"Part 11: Wireless LAN Medium Access Control(MAC) and Physical Layer (PHY) specifications:High-speed Physical Layer in the 5 GHZ Band," IEEE Std 802.11a-1999 (Supplement to IEEE Std 802.Nov. 1999), Supplement to IEEE Standard for Information technology—Telecommunications and information exchange between systems—Local and metropolitan area networks—Specific requirements, pp. 1-91 (Sep. 16, 1999).

"Part 11: Wireless LAN Medium Access Control(MAC) and Physical Layer (PHY) specifications, Amendment 2: Higher speed Physical Layer (PHY)extension in the 2.4 GHz band-Corrigendum 1," IEEE Std 802.11b-1999/Cor 1-2001 (Corrigendum to IEEE Std 802.11b-1999), IEEE Standard for Information technology—Telecommunications and Information exchange between systems—Local and metropolitan area networks-Specific requirements, pp. 1-24 (Nov. 7, 2001).

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHZ band," IEEE P802.11g/D8.2 P802.11g, pp. 1-71 (Apr. 2003).

"Part 11: Wireless LAN Medium Access Control(MAC) and Physical Layer (PHY) specifications: Higher-Speed Physical Layer Extension in the2.4 GHz Band," IEEE Std 802.11b-1999 (R2003) (Supplement to ANSI/IEEE Std 802.11, 1999 Edition), Supplement to IEEE Standard for Information technology—Telecommunications and information exchange between systems—Local and metropolitan area networks—Specific requirements, pp. 1-96 (Jun. 12, 2003).

"Part 11: Wireless LAN Medium Access Control (MAC) and Physical Layer (PHY) specifications Amendment 4: Further Higher Data Rate Extension in the 2.4 GHz Band," IEEE SID 802.11g™—2003 (Amendment to IEEE Std 802.11™, 1999 Edition (Reaff 2003), IEEE Standard for Information technology—Telecommunications and information exchange between systems—Local and metropolitan area networks-Specific requirements, pp. 1-78 (Jun. 27, 2003).

IEEE P802.11n ™M/D11.0, "Draft Standard for Information Technology—Telecommunications and information exchange between systems—Local and metropolitan area networks—Specific requirements, Part 11: Wireless LAN Medium Access Control (MAC) and Physical Layer (PHY) specifications—Amendment 5: Enhancements for Higher Throughput," The Institute of Electrical and Electronics Engineers, Inc., 560 pages (Jun. 2009).

International Standard, ISO/IEC 8802-11, ANSI/IEEE Std 802.11, "Information technology—Telecommunications and Information exchange between systems—local and metropolitan area networks—specific requirements" Part 11: Wireless LAN Medium AccessControl (MAC) and Physical Layer (PHY) specifications, The Institute of Electrical and Electronics Engineers, Inc. (1999).

IEEE Std P802.11-REVma/06.0, "Unapproved Draft Standard for Information Technology—Telecommunications and Information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11g, 802.11h, 802.11i and 802.11j Amendments) (Revision of IEEE Std 802.11-1999) (Superseded by P802.11-REVma.sub.--D7.0)" (2006).

IEEE Std 802.11-2007 (revision of IEEE Std. 802.11-1999) "Information Standard for Information technology—Telecommunications and information exchange between systems—Local and metropolitan area networks—Specific requirements" Part 11: WirelessLAN Medium Access Control (MAC) and Physical Layer (PHY) Specifications, The Institute of Electrical and Electronics Engineers, Inc. (Jun. 12, 2007).

IEEE Std 802.11a-1999; "Supplement to IEEE Standard for Information technology—Telecommunications and Information exchange between systems—Local and metropolitan area networks—Specific requirements—Part 11: Wireless LAN Medium Access Control(MAC) and Physical Layer (PHY) specifications: High-Speed Physical Layer in the 5 GHZ Band"; 1999; pp. 1-83; Institute of Electrical and Electronics Engineers, Inc., New York, NY (1999).

IEEE Std 802.11 a-1999 (R2003) (Supplement to IEEE Std 802.11-1999) "Supplement to IEEE Standard for Information technology—Telecommunications and information exchange between systems—Local and metropolitan area networks—Specificrequirements—Part 11 : Wireless LAN Medium Access Control (MAC) and Physical Layer (PHY) specifications: High-Speed Physical Layer in the 5 GHZ Band," The Institute of Electrical and Electronics Engineers, Inc., (1999) Reaffirmed Jun. 12, 2003.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specificrequirements Part 11 : Wireless LAN Medium Access Control (MAC) and Physical Layer (PHY) specifications: Higher-speed Physical Layer Extension in the 2.4 Ghz Band," The Institute of Electrical and Electronics Engineers, Inc. (1999).

IEEE Std 802.11 b-1999/Cor 1-2001 (Corrigendum to IEEE Std 802.11 b-1999) "IEEE Standard for Information technology—Telecommunications and information exchange between systems—Local and metropolitan area networks—Specific requirements, Part 11:Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., pp. 1-15 (Nov. 7, 2001).

IEEE Std 802.11 g/D2.8, May 2002 (Supplement to ANSI/IEEE Std 802.11, 1999 Edition) "Draft Supplement to Standard [for] Information technology—Telecommunications and information exchange between systems—Local and metropolitan areanetworks—Specific requirements—Part 11: Wireless LAN Medium Access Control (MAC) and Physical Layer (PHY) specifications: Further Higher-Speed Physical Layer Extension in the 2.4 GHz Band," The Institute of Electrical and Electronics Engineers, Inc.(May 2002).

IEEE Std 802.11 g/D8.2, Apr. 2003 (Supplement to ANSI/IEEE Std 802.11, 1999 (Reaff 2003) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., pp. 1-69 (Apr. 2003).

IEEE P802.11 n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput, The Institute of Electrical and Electronics Engineers, Inc. (Sep. 2007).

IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput, The Institute of Electrical and Electronics Engineers, Inc. (Oct. 2009).

Chen, "Home Network Basis: Transmission Environments and Wired/Wireless Protocols," Prentice Hall (Jul. 2003).

Gunnam et al., "Multi-Rate Layered Decoder Architecture for Block LDPC Codes of the IEEE 802.11 n Wireless Standard," IEEE International Symposium on Circuits and Systems, 2007 (ISCAS 2007), pp. 1645-1648 (2007).

Hiertz et al., "The IEEE 802.11 Universe," IEEE Communications Magazine, pp. 62-70 (Jan. 2010).

(56) References Cited

OTHER PUBLICATIONS

Love et al., "An Overview of Limited Feedback in Wireless Communication Systems," IEEE J. on Selected Areas in Communications, vol. 26, No. 8 (Oct. 2008).

Mujtaba, "IEEE P802.11—Wireless LANs: TGn Sync Proposal Technical Specification," The Institute of Electrical and Electronics Engineers, Inc., doc.: IEEE 802.11-04/0889r6 (May 2005).

Van Nee et al. "The 802.11 n MIMO-OFDM Standard for Wireless LAN and Beyond," Wireless Personal Communications, vol. 37, pp. 445-453 (Jun. 2006).

Zhang et al., "11 ac Explicit Sounding and Feedback", The Institute of Electrical and Electronics Engineers, doc. No. IEEE 802.11-10/1105r0, (Sep. 2010).

"IEEE Draft Standard for Information Technology—Telecommunications and Information Exchange Between System—Local and Metropolitan Area Networks—Specific Requirements, Part 11: Wireless LAN Medium Access Control (MAC) and Physical Layer (PHY) Specifications, Amendment 5: Enhancements for Higher Throughput," IEEE P802.11n/D7.0, Total 557 pages (Sep. 2008).

Kim et al., "Bits Consideration for Signal fields," IEEE 802.11-10/0382r2, Total 21 pages, Institute of Electrical Electronics Engineers, New York, New York (May 20, 2010).

Sampath et al., "802.11ac Preamble," IEEE 802.11-10/876r1, Total 18 pages, Institute of Electrical Electronics Engineers, New York, New York (Jul. 13, 2010).

Stacey et al., "Proposed Specification Framework for TGac," IEEE 802.11-09/0992r2, Total 5 pages, Institute of Electrical Electronics Engineers, New York, New York (Sep. 24, 2009).

Perahia et al., "Next-generation wireless LAN: 802.11n throughput, robustness, and reliability," Cambridge University Press, Total 1 pages (Aug. 2008).

Perahia et al., "Next Generation Wireless LANS; Throughput, Robustness, and Reliability in 802.11n," Cambridge University Press, Total 181 pages (2008).

Syafei et al., "Design of 1.2 Gbps MIMO WLAN System for 4K Digital Cinema Transmission," 2009 IEEE 20th International Symposium on Personal, Indoor and Mobile Radio Communications, Tokyo, Japan, pp. 207-211, Institute of Electrical and Electronics Engineers, New York, New York (Date of Conference: Sep. 13-16, 2009; Date Added to IEEE Xplore: Apr. 15, 2010).

\* cited by examiner

| DURATION | BW | SGI | SMOOTH | MU/SU | GRP ID | RESOLVE LTF | NSTS | MU RSVD | ADDITIONAL |
|---|---|---|---|---|---|---|---|---|---|
| 12 | 4 | 1 | 1 | 1 | 4 | 1 | 9 | 1 | 14 |

142-1, 142-2, 142-3, 142-4, 142-6, 142-7, 142-8, 142-12, 142-10, 142-11

MU FIELDS: MU/SU, GRP ID, RESOLVE LTF, NSTS, MU RSVD

| MCS | STBC | CODING | RSVD | CRC | TAIL |
|---|---|---|---|---|---|
| 8 | 1 | 1 | 4 | 4 | 6 |

| BW | SGI | SMOOTH | STBC1 | STBC2 | STBC3 | STBC4 | MU/SU | GRP ID | RESOLVE LTF | NSS | MU RSVD | ADDITIONAL |
|---|---|---|---|---|---|---|---|---|---|---|---|---|
| 4 | 1 | 1 | 1 | 1 | 1 | 1 | 1 | 4 | 1 | 9 | 9 | 14 |

142-2, 142-3, 142-4, 142-5-a, 142-5-b, 142-5-c, 142-5-d, 142-6, 142-7, 142-8, 142-9, 142-10, 142-11

MU FIELDS: GRP ID, RESOLVE LTF, NSS, MU RSVD

| DURATION | BW | SGI | SMOOTH | MU/SU | MU FIELDS | ADDITIONAL |
|---|---|---|---|---|---|---|
| 12 | 4 | 1 | 1 | 1 | 39 | 14 |

| GRP ID | RESOLVE LTF | MU-MCS1 | MU-MCS2 | MU-MCS3 | MU-MCS4 | STBC | CODING | MU RSVD |
|---|---|---|---|---|---|---|---|---|
| 4 | 1 | 5 | 5 | 5 | 5 | 4 | 4 | 6 |

| BW | SGI | SMOOTH | STBC | NON-SNDG | CODING | GRP ID | MU-MCS1 | MU-MCS2 | MU-MCS3 | MU-MCS4 | MU RSVD | ADDITIONAL |
|---|---|---|---|---|---|---|---|---|---|---|---|---|
| 4 | 1 | 1 | 1 | 1 | 1 | 4 | 5 | 5 | 5 | 5 | 5 | 10 |

142-2, 142-3, 142-4, 142-5, 142-14, 152-2, 142-7, 204-1-a, 204-1-b, 204-1-c, 204-1-d, 142-10, 142-11

GENERATING AND PROCESSING MULTI-USER DATA UNITS FOR WLAN

CROSS-REFERENCES TO RELATED APPLICATIONS

This application is a continuation of U.S. patent application Ser. No. 15/063,218, filed on Mar. 7, 2016, which is a continuation of U.S. patent application Ser. No. 14/269,976 (now U.S. Pat. No. 9,281,877), entitled "Training Sequence Indication for WLAN," filed on May 5, 2014, which is a continuation of U.S. patent application Ser. No. 12/910,628 (now U.S. Pat. No. 8,724,546), entitled "Training Sequence Indication for WLAN," filed on Oct. 22, 2010, which claims the benefit of the following U.S. Provisional Patent Applications:

U.S. Provisional Patent Application No. 61/254,608, entitled "Number of Stream Indication for 11ac," filed on Oct. 23, 2009;
U.S. Provisional Patent Application No. 61/255,038, entitled "Number of Stream Indication for 11ac," filed on Oct. 26, 2009;
U.S. Provisional Patent Application No. 61/259,584, entitled "Number of Stream Indication for 11ac," filed on Nov. 9, 2009;
U.S. Provisional Patent Application No. 61/260,729, entitled "Number of Stream Indication for 11ac," filed on Nov. 12, 2009;
U.S. Provisional Patent Application No. 61/294,729, entitled "Number of Stream Indication for 11ac," filed on Jan. 13, 2010;
U.S. Provisional Patent Application No. 61/307,780, entitled "Number of Stream Indication for 11ac," filed on Feb. 24, 2010; and
U.S. Provisional Patent Application No. 61/321,390, entitled "Number of Stream Indication for 11ac," filed on Apr. 6, 2010.

The disclosures of all of the patent applications referenced above are hereby incorporated by reference herein in their entireties.

The present application is also related to U.S. patent application Ser. No. 12/910,608, entitled "Number of Streams Indication for WLAN," filed on filed on Oct. 22, 2010, which is hereby incorporated by reference herein in its entirety.

FIELD OF TECHNOLOGY

The present disclosure relates generally to communication networks and, more particularly, to a physical layer preamble format for transmissions in a multiple input, multiple output (MIMO) communications system.

DESCRIPTION OF THE RELATED ART

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY OF THE DISCLOSURE

In one embodiment, a method is for generating a multi-user data unit for transmission via a multiple input, multiple output (MIMO) communication channel. The method includes: generating, at a communication device, a plurality of training sequences to be included in a preamble of the multi-user data unit, the plurality of training sequences for facilitating multiple receivers to generate respective channel estimates; generating, at the communication device, a first field of the preamble to include a plurality of indications of respective numbers of spatial or space-time streams for respective receivers to enable each receiver among the multiple receivers to determine a respective set of one or more training sequences, in the plurality of training sequences, that corresponds to the receiver; generating, at the communication device, a second field of the preamble to include respective modulation and coding scheme information for the respective receivers; generating, at the communication device, the preamble such that i) the first field of the preamble will be transmitted prior to the plurality of training sequences being transmitted, and ii) the second field of the preamble will be transmitted after the plurality of training sequences are transmitted; generating, at the communication device, a data portion of the multi-user data unit using respective modulation and coding schemes for the respective receivers; and transmitting, with the communication device, the multi-user data unit such that data for the respective receivers are transmitted via respective sets of one or more spatial or space-time streams.

In another embodiment, an apparatus comprises a wireless network interface device having one or more integrated circuits configured to: generate a plurality of training sequences to be included in a preamble of a multi-user data unit, the plurality of training sequences for facilitating multiple receivers to generate respective channel estimates; generate a first field of the preamble to include a plurality of indications of respective numbers of spatial or space-time streams for respective receivers to enable each receiver among the multiple receivers to determine a respective set of one or more training sequences, in the plurality of training sequences, that corresponds to the receiver; generate a second field of the preamble to include respective modulation and coding scheme information for the respective receivers; generate the preamble such that i) the first field of the preamble will be transmitted prior to the plurality of training sequences being transmitted, and ii) the second field of the preamble will be transmitted after the plurality of training sequences are transmitted; generate a data portion of the multi-user data unit using respective modulation and coding schemes for the respective receivers; and transmit the multi-user data unit such that data for the respective receivers are transmitted via respective sets of one or more spatial or space-time streams.

In yet another embodiment, a method is for processing a multi-user data unit received via a MIMO communication channel. The method includes: processing, at a communication device, a plurality of indications, in a first field of a preamble of the multi-user data unit, of respective numbers of spatial or space-time streams for respective receivers of the multi-user data unit to determine a set of one or more training sequences among a plurality of training sequences in the preamble, wherein the set of one or more training sequences correspond to a set of one or more spatial or space-time streams, among a plurality of spatial or space-time streams of the multi-user data unit, that correspond to the communication device; generating, at the communication device, a channel estimate using the determined set of one or more training sequences among the plurality of training sequences, wherein the plurality of training sequences in the preamble are received after the first field of the preamble is received; using the channel estimate to process, at the communication device, a second field of the preamble that includes an indication of a modulation and coding scheme utilized for data, in a data portion of the multi-user data unit, intended for the communication device; and using, at the communication device, the indication of the modulation and coding scheme to decode data, in the data portion of the multi-user data unit, intended for the communication device.

In still another embodiment, an apparatus includes a wireless network interface device associated with a communication device, the wireless network interface device having one or more integrated circuits configured to: process a plurality of indications, in a first field of a preamble of a multi-user data unit, of respective numbers of spatial or space-time streams for respective receivers of the multi-user data unit to determine a set of one or more training sequences among a plurality of training sequences in the preamble, wherein the set of one or more training sequences correspond to a set of one or more spatial or space-time streams, among a plurality of spatial or space-time streams of the multi-user data unit, that correspond to the communication device; generate a channel estimate using the determined set of one or more training sequences among the plurality of training sequences, wherein the plurality of training sequences in the preamble are received after the first field of the preamble is received; use the channel estimate to process a second field of the preamble that includes an indication of a modulation and coding scheme utilized for data, in a data portion of the multi-user data unit, intended for the communication device; and use the indication of the modulation and coding scheme to decode data, in the data portion of the multi-user data unit, intended for the communication device.

BRIEF DESCRIPTION OF THE DRAWINGS

FIGS. 7A and 7B are diagrams of example bit allocations for a data unit, according to another embodiment;

FIG. 8 is a diagram of another example bit allocation for a data unit, according to still another embodiment;

FIGS. 13A and 13B are diagrams of an example bit allocation for a data unit, according to yet another embodiment;

FIG. 16 is a diagram of another example bit allocation for a data unit, according to an embodiment;

DETAILED DESCRIPTION

Figure 1:
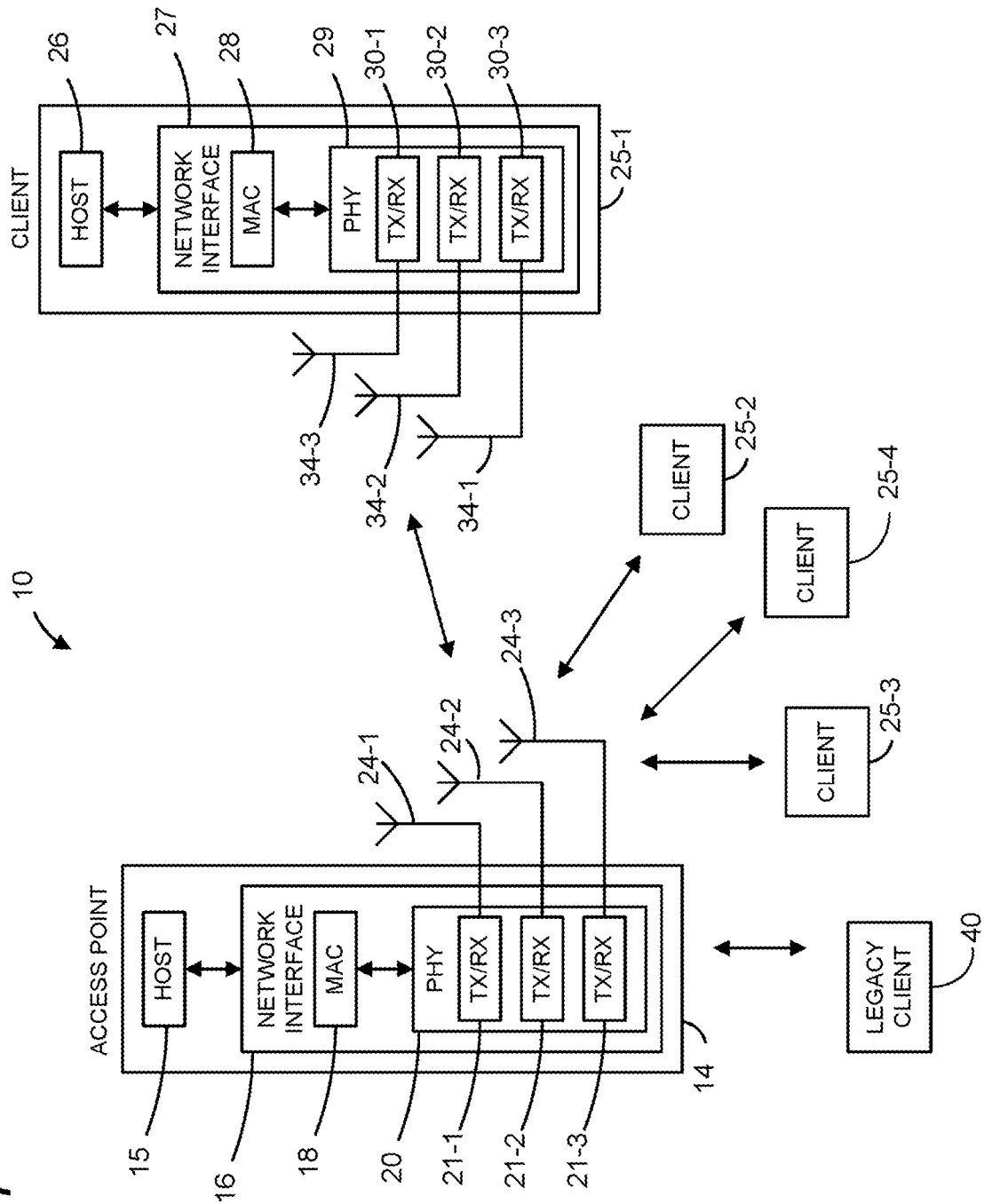
FIG. 1 is a block diagram of an example wireless local area network (WLAN), according to an embodiment.

FIG. 1 is a block diagram of an example wireless local area network (WLAN) 10, according to an embodiment. The WLAN 10 supports downlink (DL) multiuser (MU) multiple-input and multiple-output (MIMO) communication between an access point (AP) and a plurality of client stations. Additionally, the WLAN 10 supports DL single-user (SU) communication between the AP and each of a plurality of client stations. The AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC unit 18 and the PHY unit 20 are configured to operate according to a first communication protocol (e.g., the IEEE 802.11ac Standard, now in the process of being standardized). In another embodiment, the MAC unit 18 and the PHY unit 20 are also configured to operate according to a second communication protocol (e.g., the IEEE 802.11n Standard, the IEEE 802.11a Standard, the IEEE 802.11g Standard, etc.). The first communication protocol is referred to herein as a very high throughput (VHT) protocol, and the second communication protocol is referred to herein as a legacy protocol.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the VHT protocol. The WLAN 10 also includes a client station 40 that is not configured to operate according to the VHT protocol but is configured to operate according to the legacy protocol, in some embodiments. Such a client station 40 is referred to herein as a "legacy client station". In some embodiments, the WLAN 10 includes more than one legacy client station. In other embodiments, the WLAN 10 includes no legacy client stations.

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY unit 20 of the AP 14 is configured to generate data units conforming to the VHT protocol and having formats described hereinafter. The transceiver(s) 21 is/are configured to transmit the generated data units via the antenna(s) 24. Similarly, the transceiver(s) 21 is/are configured to receive data units conforming to the VHT protocol via the antenna(s) 24. The PHY unit 20 of the AP 14 is configured to process received data units conforming to the VHT protocol and having formats described hereinafter.

In various embodiments, the PHY unit 29 of the client station 25-1 is configured to generate data units conforming to the VHT protocol and having formats described hereinafter. The transceiver(s) 30 is/are configured to transmit the generated data units via the antenna(s) 34. Similarly, the transceiver(s) 30 is/are configured to receive data units conforming to the VHT protocol via the antenna(s) 34. The PHY unit 29 of the client station 25-1 is configured to process received data units conforming to the VHT protocol and having formats described hereinafter, according to various embodiments.

Figure 2:
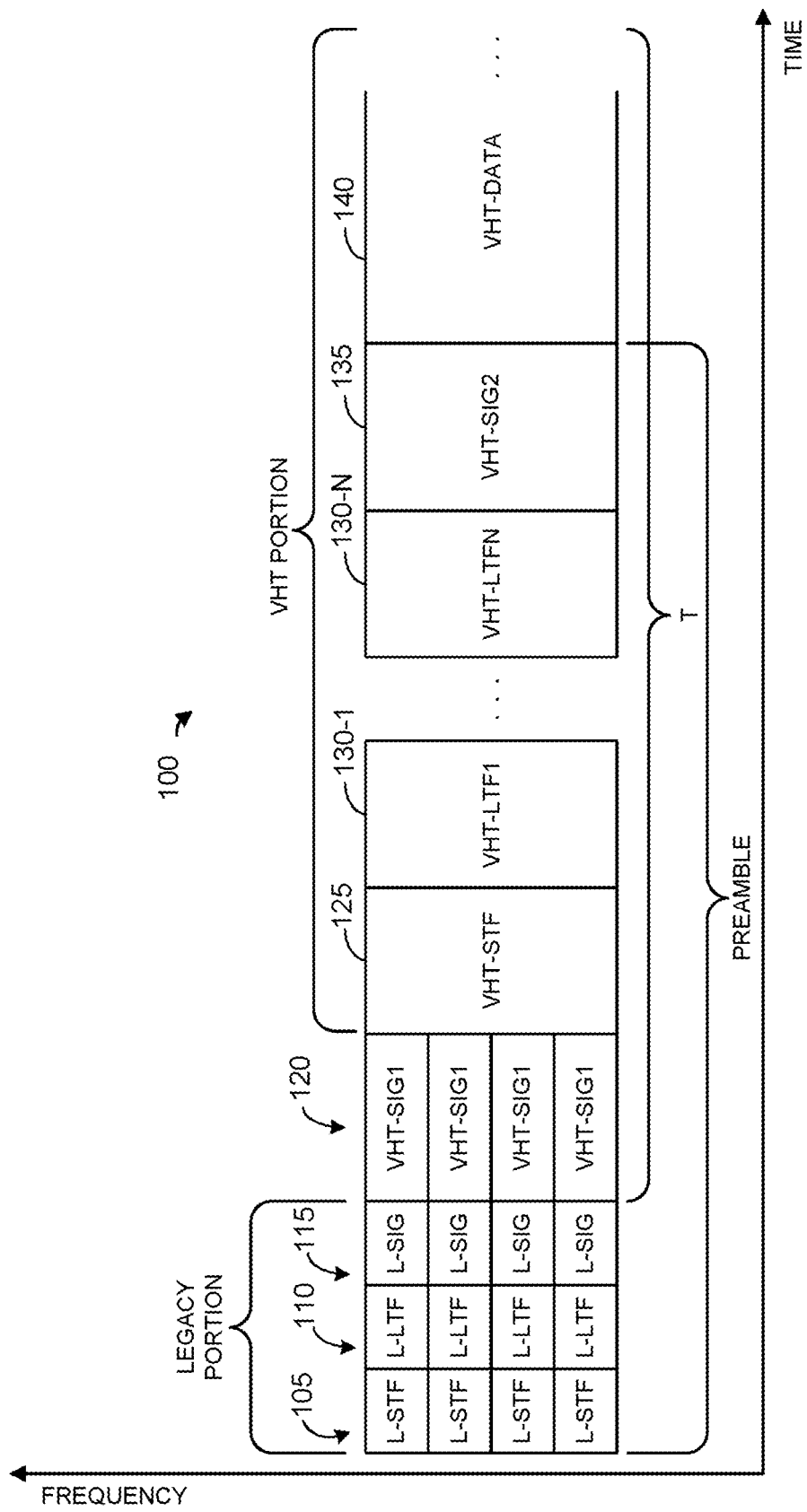
FIG. 2 is a diagram of an example data unit format, according to another embodiment.

FIG. 2 is a diagram of a data unit 100 that the AP 14 is configured to transmit data units to the client station 25-1 using orthogonal frequency division multiplexing (OFDM) modulation, according to an embodiment. The data unit 100 conforms to the VHT protocol and occupies an 80 MHz band. In other embodiments, data units similar to the data unit 100 occupy different bandwidths such as 20 MHz, 40 MHz, 120 MHz, 160 MHz, or any suitable bandwidth. The data unit 100 is suitable for "mixed mode" situations, such as when the WLAN 10 includes a client station (e.g., the legacy client station 40) that conforms to the legacy protocol, but not the VHT protocol. The data unit 100 can be utilized in other situations as well.

The data unit 100 includes a preamble having four legacy short training fields (L-STFs) 105; four legacy long training fields (L-LTFs) 110; four legacy signal fields (L-SIGs) 115; four first very high throughput signal fields (VHT-SIG1$s$) 120; a very high throughput short training field (VHT-STF) 125; N very high throughput long training fields (VHT-LTFs) 130, where N is an integer; and a second very high throughput signal field (VHT-SIG2) 135. The data unit 100 also includes a very high throughput data portion (VHT-DATA) 140. The L-STFs 105, the L-LTFs 110, and the L-SIGs 115 form a legacy portion. The VHT-STF 125, the VHT-LTFs 130, the VHT-SIG2 135, and the VHT-DATA 140 form a very high throughput (VHT) portion.

Each of the L-STFs 105, each of the L-LTFs 110, each of the L-SIGs 115, and each of the VHT-SIG1$s$ 120 occupy a 20 MHz band, in one embodiment. In the present disclosure, several example data units, including the data unit 100, having an 80 MHz contiguous bandwidth are described for the purposes of illustrating embodiments of frame formats, but these frame format embodiments and other embodiments are applicable to other suitable bandwidths (including non-contiguous bandwidths). For instance, although the preamble of the data unit 100 includes four of each of the L-STFs 105, the L-LTFs 110, the L-SIGs 115, and the VHT-SIG1$s$ 120, in other embodiments in which an OFDM data unit occupies a cumulative bandwidth other than 80 MHz, such as 20 MHz, 40 MHz, 120 MHz, 160 MHz, etc., a different suitable number of the L-STFs 105, the L-LTFs 110, the L-SIGs 115, and the VHT-SIG1$s$ 120 are utilized accordingly. For example, for an OFDM data unit occupying a 20 MHz cumulative bandwidth, the data unit includes one of each of the L-STFs 105, the L-LTFs 110, the L-SIGs 115, and the VHT-SIG1$s$ 120; a 40 MHz bandwidth OFDM data unit includes two of each of the fields 105, 110, 115, and 120; a 120 MHz bandwidth OFDM data unit includes six of each of the fields 105, 110, 115, and 120; a 160 MHz bandwidth OFDM data unit includes eight of each of the fields 105, 110, 115, and 120, and so on, according to some embodiments.

In the example data unit 100, each of the VHT-STF 125, the VHT-LTFs 130, the VHT-SIG2 135, and the VHT-DATA 140 occupy the entire 80 MHz cumulative bandwidth of the data unit 100. Similarly, in the case of an OFDM data unit conforming to the first VHT protocol and occupying a cumulative bandwidth such as 20 MHz, 40 MHz, 120 MHz, or 160 MHz, each of the VHT-STF 125, the VHT-LTFs 130, the VHT-SIG2 135, and the VHT-DATA 140 occupy the corresponding entire cumulative bandwidth of the data unit, in some embodiments.

In some embodiments, the 80 MHz band of the data unit 100 is not contiguous, but includes two or more smaller bands, such as two 40 MHz bands, separated in frequency. Similarly, for other OFDM data units having different cumulative bandwidths, such as a 160 MHz cumulative bandwidth, in some embodiments the band is not contiguous in frequency. Thus, for example, the L-STFs 105, the L-LTFs 110, the L-SIGs 115, and the VHT-SIG1$s$ 120 occupy two or more bands that are separated from each other in frequency, and adjacent bands are separated in frequency by at least one MHz, at least five MHz, at least 10 MHz, at least 20 MHz, for example, in some embodiments.

According to an embodiment, each of the L-STFs 105 and each of the L-LTFs 110 have a format as specified in a legacy protocol such as the IEEE 802.11a Standard and/or the IEEE 802.11n Standard. In an embodiment, each of the L-SIGs 115 has a format at least substantially as specified in legacy protocol (e.g., the IEEE 802.11a Standard and/or the IEEE 802.11n Standard). The length and rate subfields in the L-SIGs 115 is set to indicate the duration T corresponding to the remainder of the data unit 100 after the legacy portion. This permits client stations that are not configured according to the VHT protocol to determine an end of the data unit 100 for carrier sense multiple access/collision avoidance (CSMA/CA) purposes, for example. For instance, a legacy client station configured according to the IEEE 802.11a Standard detects a data error from the VHT-SIG1$s$ 120, according to the receiver state machine specified in the IEEE 802.11a Standard. In this situation, the legacy client station waits until the end of the duration T before performing clear channel assessment (CCA). In another example, a legacy client station configured according to the IEEE 802.11n Standard will detect an error in response to receiving the VHT-SIG1s 120 and/or the VHT-SIG2 135, such as a cyclic redundancy check (CRC) error. In this situation, the legacy client station waits until the energy of the data unit 100 drops out before switching to CCA idle mode.

In the data unit 100, the frequency domain symbols of the legacy portion are repeated over four 20 MHz subbands of the 80 MHz band. Legacy client stations that are configured according to the IEEE 802.11a Standard and/or the IEEE 802.11n Standard with 20 MHz bandwidth will recognize a legacy IEEE 802.11a Standard preamble in any of the 20 MHz subbands. In some embodiments, the modulations of the different 20 MHz subband signals are rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment.

In some embodiments, the modulations of the VHT-SIG1s 120 in the different 20 MHz subbands is rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment. In an embodiment, the same rotations utilized in the legacy portion (if present) are utilized for the VHT-SIG1s 120. In at least some examples, the VHT-SIG1s 120 are collectively referred to as a single first very high throughput signal field (VHT-SIG1) 120.

As shown in FIG. 2, the VHT-SIG2 135 are included after one or more of the VHT-LTFs 130 and are spatially mapped the same way as one of the one or more VHT-LTFs 130. For example, the VHT-SIG2 135 are spatially mapped by a vector $QP_1$, where Q is an antenna map or spatial mapping matrix that maps spatial streams, or space-time streams if space-time encoding is utilized, to transmit antennas, and $P_1$ is a first column in a spatial stream mapping matrix P, which is a Hadamard matrix in which each element of P is +1 or −1, in an embodiment. In another embodiment, each element of P is a complex number (e.g., a Discrete Fourier Transform matrix is used as P). In another embodiment, some elements of P are integers other than +1 or −1. In an embodiment, $P_1$ corresponds to a first spatial stream.

More generally, as each VHT-LTF is generated, a separate column of the matrix P is used to map the values to spatial streams. For example, the first column of the matrix P, i.e., $P_1$, is applied to the signal VHT-LTF1 130-1, the second column of the matrix P, i.e., $P_2$, is applied to the signal VHT-LTF2, etc., in an embodiment. Thus, a client station 25 may use the channel estimation from the VHT-LTF1 to decode the VHT-SIG2 135, in an embodiment. According to another embodiment, the VHT-SIG2 is spatially mapped by a vector $QP_N$ so that a client station 25 may use the channel estimation from the VHT-LTFN 130-N to decode the VHT-SIG2 135, in another embodiment. Various other suitable embodiments of the data unit 100, including various suitable positions of the VHT-SIG2 135, are described in U.S. patent application Ser. No. 12/758,603, entitled "Physical Layer Frame Format for WLAN," filed on Apr. 12, 2010, which is hereby incorporated by reference herein in its entirety.

By placing the VHT-SIG2 135 after one or more of the VHT-LTFs 130 and spatially mapping the VHT-SIG2 135 in the foregoing manner, the PHY unit 20, the transceivers 21, and the antennas 24 may implement space-division multiple access (SDMA) downlink transmissions which differentiate the VHT-SIG2 135 for different users by beam-steering, while the L-STFs 105, the L-LTFs 110, the L-SIGs 115, and the VHT-SIG1s 120 remain unsteered (or "omnidirectional" or "pseudo-omnidirectional"; the terms "unsteered" and "omnidirectional" as used herein are intended to also encompass the term "pseudo-omnidirectional") and contain PHY information that is common to each of the client stations 25. On the other hand, the VHT-SIG2 135 includes different data for different clients 25 that are simultaneously transmitted, via the antennas 24, over different spatial channels to carry different (or "user-specific") content to each of the client stations 25. Accordingly, the VHT-SIG2 135 illustrated in FIG. 2 represents different information being transmitted to different clients via different spatial streams, in some embodiments. For ease of explanation, the VHT-SIG2 135, and other steered portions of the various data units disclosed herein, may at times be illustrated and/or described herein in this manner. However, it will be understood that the VHT-SIG2 135 and other such steered portions may include different information being transmitted to different clients via different spatial streams, in some embodiments as discussed above, for example.

The VHT-SIG1 120 comprises two OFDM symbols, according to an embodiment. The VHT-SIG2 135 comprises one OFDM symbol, according to an embodiment.

The preamble of the data unit 100 allows each client station 25 to estimate at least a portion of the signal channel from the AP 14 to the client station 25, and based on this estimation, equalize the channel to decode data (e.g., within the VHT-DATA 140) transmitted from the AP 14 to the client station 25 (e.g., the client station 25-1). For example, the client station 25-1 determines a number of channel dimensions from the AP 14 to the client station 25-1 and estimates each of the channel dimensions using one or more of the VHT-LTFs 130, in an embodiment. The data unit 100 indicates a number of spatial streams, or space-time streams if space-time encoding is utilized, transmitted from the AP 14 to each of the client stations 25, and the client station 25-1 may further determine which particular spatial streams or space-time streams transmitted from the AP 14 include information for the client station 25-1. In order to allow the client station 25-1 to estimate its corresponding number of channel dimensions, the AP 14 transmits a corresponding number of the VHT-LTFs 130 to the client station 25-1, in an embodiment.

In an embodiment, one or more of the VHT-LTFs 130 that are allocated to a particular client station 25 for channel estimation are not allocated to one or more of the other client stations 25 for channel estimation. According to an embodiment, the PHY unit 20 generates at least enough VHT-LTFs 130 to jointly train all of the client stations 25 to estimate the signal channels corresponding thereto. In an embodiment, the data unit 100 indicates the number of spatial streams, or space-time streams if space-time encoding is utilized, transmitted from the AP 14 to each of the client stations 25. In an embodiment, when the VHT-LTFs 130 are resolvable, each client station 25 receives all of the VHT-LTFs 130 and uses the indication of the number of spatial or space-time streams to determine which ones of the VHT-LTFs 130 to use for its own channel estimation, in advance of receiving the VHT- LTFs 130. For example, in some embodiments one or more indications of the number of spatial/space-time streams corresponding to a particular client station 25 are included in the VHT-SIG2 135. The data unit 100 also or alternatively includes a suitable indication of the corresponding number of spatial/space-time streams in the VHT-SIG1 120, in an embodiment. Several examples of such an indication are described in detail below.

By making an advance determination of which ones of the VHT-LTFs 130 are needed for channel estimation, each client station 25 avoids buffering other ones of the VHT-LTFs 130 in memory that are not needed for channel estimation, in an embodiment. Such an advance determination also allows the client station 25 to begin channel estimation substantially contemporaneously with receipt of the VHT-LTFs 130, in an embodiment. For instance, if the beginning of channel estimation is delayed beyond receipt of the VHT-LTFs 130 corresponding to the spatial/space-time streams for the client station 25, the client station 25 may need to be able to rapidly perform channel estimation and determine an equalizer for the channel in time to accurately decode the data in the VHT-DATA 140. Such rapid channel estimation may create an undesirable processing load on the PHY unit 29, in some embodiments.

In some embodiments where the VHT-LTFs 130 are resolvable, each client station 25 also attempts to mitigate, or "whiten", interference resulting from the spatial/space-time streams sent to other ones of the client stations 25. Therefore, the data unit 100 enables each client station 25 to determine not only the number of spatial/space-time streams from the AP 14 to the client station 25, but also the numbers of spatial/space-time streams from the AP 14 to each other one of the client stations 25, in an embodiment. The data unit 100 also enables each client station 25 to determine which ones of the VHT-LTFs 130 each other client station 25 needs to use for channel estimation. Each client station 25 then uses the channel training information for the other client stations 25 to mitigate received interference from the spatial/space-time streams sent to each of the other client stations 25. In these embodiments as well, the data unit 100 advantageously allows each client station 25 to make an advance determination of which ones of the VHT-LTFs 130 to use for channel estimation, even though others of the VHT-LTFs 130 are used for interference mitigation or whitening.

Figure 3A:
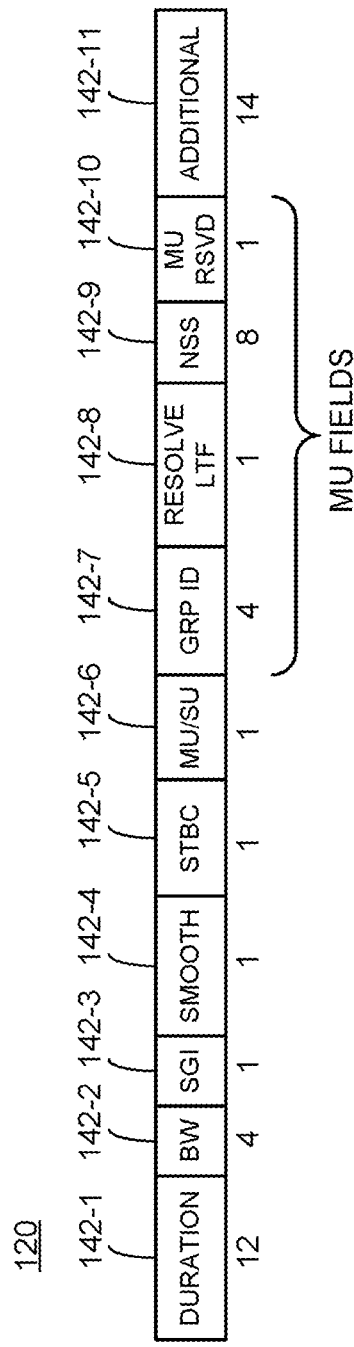
FIGS. 3A and 3B are diagrams of example bit allocations for a data unit, according to yet another embodiment.
Figure 3B:
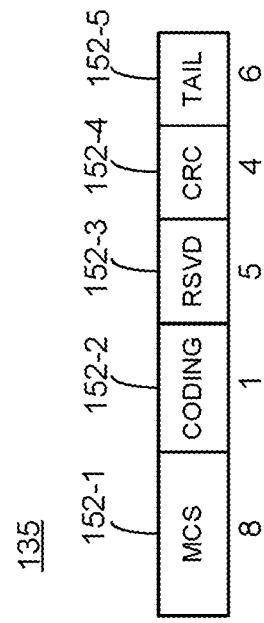

FIGS. 3A and 3B are diagrams of example bit allocations for the VHT-SIG1 120 and VHT-SIG2 135, respectively, according to an embodiment. The example bit allocations of FIGS. 3A and 3B are used when the AP 14 is supporting downlink multiuser MIMO (DL-MUMIMO) communication, in an embodiment. As shown in FIG. 3A, the VHT-SIG1 120 includes a plurality of subfields 142. The plurality of subfields 142 includes a duration subfield 142-1, a bandwidth subfield 142-2, a short guard interval (SGI) subfield 142-3, a smoothing subfield 142-4, a space-time block coding (STBC) subfield 142-5, a multi-user (MU)/single-user (SU) subfield 142-6, a group ID subfield 142-7, a resolvable LTF subfield 142-8, a number of spatial streams (Nss) subfield 142-9, and an MU reserved subfield 142-10 which may be for implementing MU features developed in the future, etc. The VHT-SIG1 120 also includes one or more additional subfields which are collectively referred to as additional subfields 142-11. The additional subfields 142-11 include, for example, one or more of a cyclic redundancy check (CRC) subfield, a subfield including tail bits, a reserved subfield for implementing features developed in the future, etc., in various embodiments.

According to an embodiment, the MU/SU subfield 142-6 includes a single bit which is set to a logic "1" to indicate that the AP 14 is operating in MU mode. According to another embodiment, the single bit in the MU/SU subfield 142-6 is set to a logic "0" to indicate that the AP 14 is operating in MU mode. As further described below, the group ID subfield 142-7 indicates an MU group to which the data unit 100 is directed, in an embodiment. In some other embodiments, the MU/SU subfield 142-6 is removed, and one of the possible bit sequences of the group ID subfield 142-7 is reserved for the purpose of indicating that the data unit 100 is an SU data unit. As just one example, every bit in the group ID subfield 142-7 is set to a logic "1" to indicate SU mode, in an embodiment. As just one further example, every bit in the group ID subfield 142-7 is set to a logic "0" to indicate SU mode, in an embodiment. In still further embodiments, one possible bit sequence of the group ID subfield 142-7 is used to indicate that the data unit 100 is a broadcast frame, in addition to or instead of using one possible bit sequence of the group ID subfield 142-7 to indicate that the data unit 100 is an SU data unit. In even further embodiments, the bit sequence of the group ID subfield 142-7 used to indicate that the data unit 100 is a broadcast frame is the same bit sequence which is used when the data unit 100 is an SU data unit. The bit sequence of the group ID subfield 142-7 which is used when the data unit 100 is an SU data unit is also used when the data unit 100 is an MU data unit but one or more of the client stations 25 have not been assigned to an MU group, according to an embodiment.

In MU mode, the STBC subfield 142-5 and the Nss subfield 142-9 provide indications of numbers of space-time streams for each of the client stations 25.

As will be recognized by one of ordinary skill in the art in light of the teaching and disclosure herein, the number of space-time streams corresponding to a client station 25 is a number of spatial streams transmitted to the client station 25 via the antennas 24 when STBC is not used. Accordingly, for purposes of the present disclosure, a spatial stream that is not encoded using STBC may at times be referred to herein as a space-time stream for ease of explanation. When spatial streams transmitted to a client station 25 are encoded using STBC, the number of space-time streams corresponding to the client station 25 are determined by the number of spatial streams corresponding to the client station 25 and by a particular space-time block code being used, such as an Alamouti code. For example, encoding a single spatial stream with an Alamouti code results in two space-time streams.

According to an embodiment, the STBC setting is the same for each of the client stations 25, and as such only a single bit is required in the STBC subfield 142-5 to indicate whether STBC is being used. As shown in FIG. 3A, the STBC subfield 142-5 includes one bit, which is, for example, set to "1" if STBC is being used and "0" if STBC is not being used, or vice versa. According to an embodiment, the number of spatial streams corresponding to each of the client stations 25 is different. Each of the client stations 25 determines its corresponding number of spatial streams using a unique index value assigned to that client station 25 using a management frame or control frame, such as a sounding frame.

Figure 4:
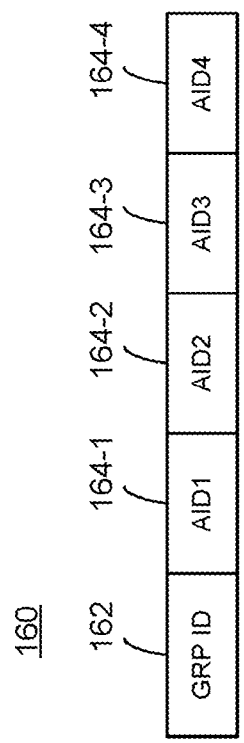
FIG. 4 is a diagram of an example group definition field, according to still another embodiment.

For example, the AP 14 assigns a unique index value to each of the client stations 25 prior to transmission of the data unit 100 by first transmitting a sounding frame to each of the client stations 25. The sounding frame includes one or more group definition fields. FIG. 4 is a diagram of an example group definition field 160. The group definition field 160 includes a group identifier (group ID) subfield 162 and one or more association identifier (AID) subfields 164. The AID subfields 164 include as many subfields as there are MU-MIMO users assigned to a group identified by the group ID subfield 162 (i.e., an "MU group"). For example, as shown in FIG. 4, the AID subfields 164 include a first AID (AID1) subfield 164-1, a second AID (AID2) subfield 164-2, a third AID (AID3) subfield 164-3, and a fourth AID (AID4) subfield 164-4. In one embodiment, the group definition field 160 is generated by the PHY unit 20. In another embodiment, at least one of the AID subfields 164, and/or information included therein, are generated at least in part by the MAC unit 18.

Each of the AID subfields 164 includes an AID of one of the client stations 25 that the AP 14 has assigned to the MU group identified by the group ID subfield 162. Each one of the client stations 25 is configured to receive the entire group definition field 160 and, after detecting its own AID within one of the AID subfields 164, determine that the particular client station 25 is a member of the MU group identified by the group ID subfield 162. Each client station 25 further determines, based on the placement of its own AID relative to the AIDs of the other client stations 25 in the AID subfields 164, the order in which the indication of its own number of spatial streams is transmitted in the Nss subfield 142-9, relative to the indications for the other client stations 25. In the event that the group definition field 160 does not include the AID of a particular client station 25, that client station 25 determines that it is not a member of the MU group identified by the group ID subfield 162 and, for example, monitors subsequent group definition fields within the same or a different sounding frame until the client station 25 determines an MU group to which it belongs, in an embodiment.

For example, the client station 25-2 detects the first AID subfield 164-1 and determines that the AID in the first AID subfield 164-1 does not match the AID of the client station 25-2. The client station 25-2 then detects the second AID subfield 164-2 and determines that the AID in the second AID subfield 164-2 matches the AID of the client station 25-2. The client station 25-2 therefore determines that it is a member of the MU group identified by the group ID subfield 162, and further determines that its unique index value is the number two, i.e., that the indication of its own number of spatial streams will be the second indication within the Nss subfield 142-9 in order of receipt. Based on detection of the AIDs in the other AID subfields 164-1, 164-3, and 164-4, the second client station 25-2 also determines the unique index values assigned to the other client stations 25-1, 25-3, and 25-4. Of course, in the example group definition field 160, the AID of a particular client station, such as the client station 25-2, is included in any other suitable one of the AID subfields 164 (e.g., the subfield 164-1, the subfield 164-3, etc.), in some embodiments.

The AP 14 is configured to transmit a sounding frame including the group definition field 160 to each of the client stations 25. The sounding frame also is used to request an acknowledgement from each one of the client stations 25 of the user index value associated therewith, and to request channel measurement feedback, in an embodiment. The AP 14 determines the spatial mapping Q matrix for the client stations 25 by processing responsive feedback frames. The PHY unit 20 is configured to use the Q matrix to generate the VHT-SIG2 135, which the transceivers 21 and the antennas 24 transmits to the different client stations 25 simultaneously over a plurality of different spatial channels. Various example implementations of beam-steering of signal fields such as the VHT-SIG2 135 are described in U.S. patent application Ser. No. 12/750,636, entitled "Sounding and Steering Protocols for Wireless Communications," filed on Mar. 30, 2010, which is hereby incorporated by reference herein in its entirety. Example implementations of beam-steering of signal fields such as the VHT-SIG2 135, including through the use of sounding frames, are also described in U.S. patent application Ser. No. 12/175,526, entitled "Access Point with Simultaneous Downlink Transmission of Independent Data for Multiple Client Stations," filed on Jul. 18, 2008, which is hereby incorporated by reference herein in its entirety.

Figure 5:
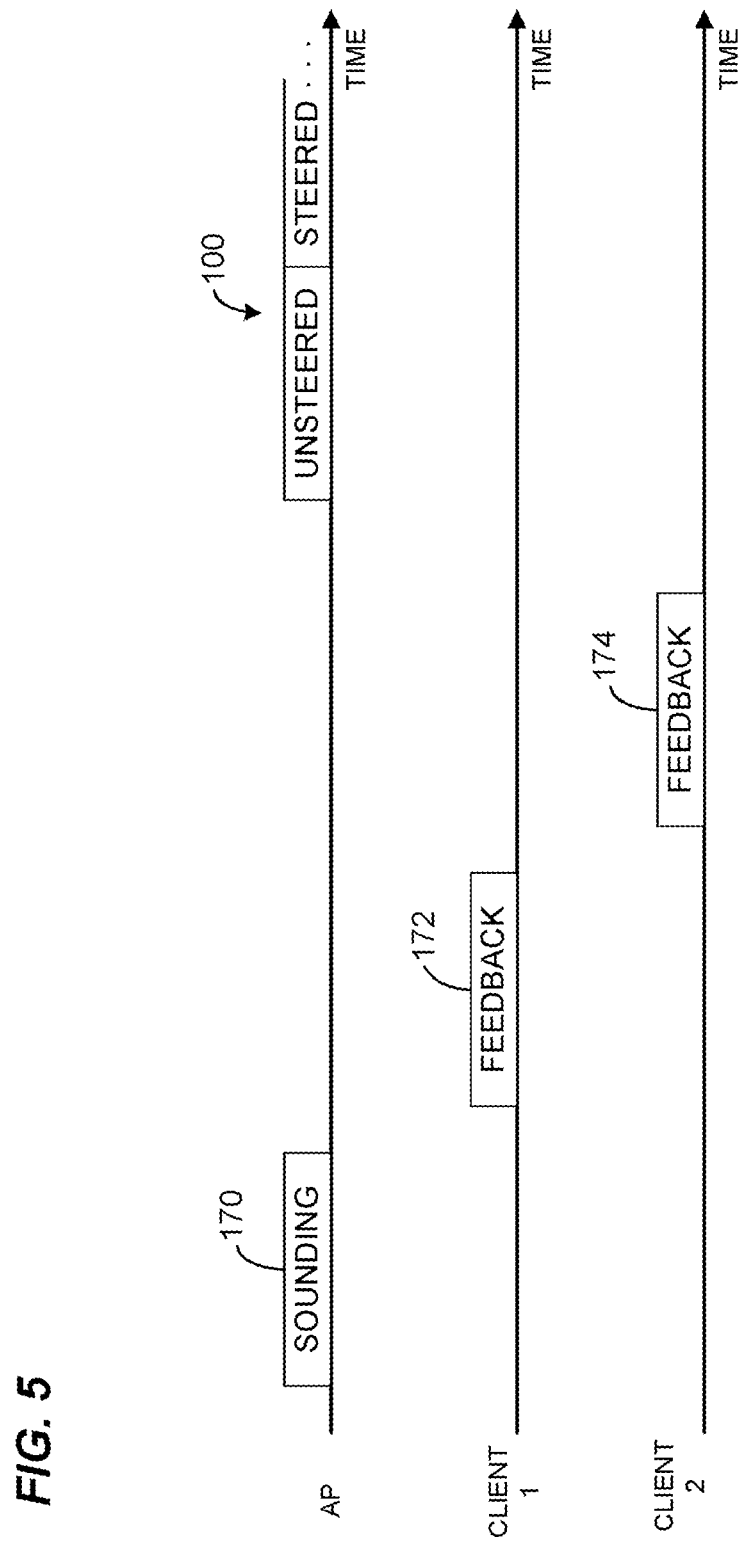
FIG. 5 is an example sounding timing diagram, according to a still further embodiment.

FIG. 5 is an example timing diagram that shows a sounding frame 170 being transmitted from the AP 14 to each of the client stations 25, according to an embodiment. For example, the AP 14 broadcasts the sounding frame 170 to the client stations 25. Alternatively, the AP 14 transmits multiple sounding frames to the client stations 25, where a different one of the sounding frames is transmitted to each one of the client stations 25. For ease of explanation, however, the disclosure herein will refer to the sounding frame 170 being transmitted to each of the client stations 25 (e.g., the client stations 25-1 and 25-2).

The sounding frame 170 includes a payload portion, which includes the group definition field 160, according to an embodiment. In another embodiment, the sounding frame 170 omits a payload portion, and the group definition field 160 is included in a PHY preamble portion. According to an embodiment, in response to the client station 25-1 receiving the sounding frame 170 and receiving and recording its associated user index value contained therein, the PHY unit 29 of the client station 25-1 generates a feedback frame 172 for transmission to the AP 14 during a first time slot. Similarly, in response to the client station 25-2 receiving the sounding frame 170 and receiving and recording its associated user index value contained therein, the PHY unit 29 of the client station 25-2 generates a feedback frame 174 for transmission to the AP 14 during a second time slot, and so on for any other ones of the client stations 25. Each of the feedback frames 172 and 174 includes a suitable acknowledgement that the corresponding one of the client stations 25 has received and recorded its associated user index value. Accordingly, upon receipt of the feedback frames 172 and 174, the AP 14 verifies that each of the client station 25-1 and the client station 25-2 correctly recorded its assigned user index value. The AP 14 also uses the feedback frames 172 and 174 to determine the spatial mapping Q matrix, as discussed above.

Other suitable implementations of sounding frames, non-sounding management frames, etc. are also used to assign a group identifier and associated unique index value to each of the client stations 25, in other embodiments. For example, the group definition field 160 is transmitted within a non-sounding management frame, according to an embodiment. As just one additional example, the AP 14 uses a non-sounding management frame to implement a "stand-alone" MAC or AID exchange, e.g., an association of MAC addresses or AIDs of the client stations 25 with group IDs and user index values without a request for channel measurement feedback, in an embodiment. In one embodiment, the MAC unit 18 generates at least part of the non-sounding management frame and/or the information therein. In another embodiment, the PHY unit 20 generates the non-sounding management frame. For example, a payload portion of the management frame associates a MAC address or AID of the client station 25-1 with a group ID and a first index value, such as the number one, according to an embodiment. The data portion further associates a MAC address or AID of the client station 25-2 with the same group ID and a second index value, a MAC address or AID of the client station 25-3 with the same group ID and a third index value, and a MAC address or AID of the client station 25-4 with the same group ID and a fourth index value, according to an embodiment.

In still another embodiment using a non-sounding management frame, the non-sounding management frame is a unicast frame that assigns multiple group IDs and associated unique index values for each group ID to a single client station 25. According to yet another embodiment, the non-sounding management frame is a multicast frame that is transmitted to an entire MU group. The multicast frame assigns multiple group IDs, and associated unique index values for each group ID, to one or more client stations 25 in the MU group to which the multicast frame is transmitted.

According to an embodiment, the unique index values assigned to the client stations 25 are refreshed each time the AP 14 transmits a sounding frame or other management frame. According to another embodiment, the unique index values assigned to the client stations 25 are refreshed less frequently. For example, the unique index values are refreshed every second time the AP 14 transmits a sounding frame or other management frame, every third time, etc., according to other embodiments. The frequency with which the unique index values are refreshed depends on a degree and/or rate of change of the characteristics of the signal channels between the AP 14 and the client stations 25, according to an embodiment.

Once a client station 25 determines both that it is a member of a particular MU group and its unique index value within the particular MU group, the client station 25 determines, upon receipt of the group ID subfield 142-7, whether the group ID subfield 142-7 matches the group ID subfield 162 or an ID of any other MU group to which the client station 25 belongs. For example, the client station 25 is assigned to multiple MU groups using multiple group definition fields 160, or other suitable management frames or control frames, in some embodiments. If the client station 25 determines that the group ID subfield 142-7 matches the group ID subfield 162 or the group ID of any other MU group to which the client station 25 belongs, the client station 25 processes the entire VHT-SIG1 120. The client station 25 thereby determines its corresponding number of space-time streams. According to an embodiment, if the group ID subfield 142-7 does not match the group ID subfield 162 or the group ID of any other MU group to which the client station 25 belongs, the client station 25 determines that it is not a member of the MU group to which the data unit 100 is directed and disregards the remainder of the data unit 100. By disregarding the remainder of the data unit 100, the client station 25 conserves power by, for example, not attempting to receive and/or decode the remainder of the data unit 100.

Figure 6:
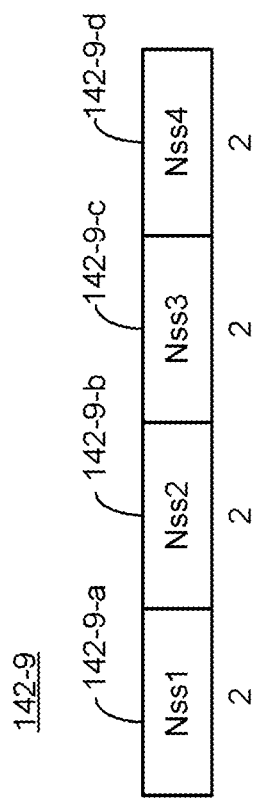
FIG. 6 is a diagram of a number of spatial streams subfield, according to yet a further embodiment.

According to an embodiment, one possible bit sequence of the group ID subfield 142-7 is reserved for the purpose of indicating that the data unit 100 is an SU data unit. Therefore, if the group ID subfield 142-7 does not match the group ID subfield 162 pertaining to a previous MU transmission, but the group ID 142-7 does match the reserved bit sequence, the client station 25 determines that the data unit 100 is an SU data unit, in some embodiments, In order to indicate the number of spatial streams corresponding to each unique index value, and thereby indicate (in conjunction with the STBC subfield 142-5) a corresponding number of space-time streams, the Nss subfield 142-9 itself includes a plurality of subfields. Each one of the plurality of Nss sub-subfields includes information for one of each of the client stations 25. FIG. 6 is a diagram of Nss subfield 142-9 showing that Nss subfield 142-9 is formed from four Nss sub-subfields 142-9-*a*, 142-9-*b*, 142-9-*c*, and 142-9-*d*, according to an embodiment. The Nss sub-subfields 142-9-*a*, 142-9-*b*, 142-9-*c*, and 142-9-*d* are labeled Nss1, Nss2, Nss3, and Nss4, respectively, and each includes an indication of the number of spatial streams allocated to the corresponding client, according to an embodiment. In the example of FIG. 3A, the Nss subfield 142-9 includes a total of eight bits, such that two bits are allocated to each of the Nss sub-subfields 142-9-*a*, 142-9-*b*, 142-9-*c*, and 142-9-*d* as shown in FIG. 6, in an embodiment. Each client station 25 each receives the entire Nss subfield 142-9, but determines which of the Nss sub-subfields 142-9-*a*, 142-9-*b*, 142-9-*c*, and 142-9-*d* corresponds to the client station 25 by using the unique index value assigned to the client station 25 (during the group definition process or other process of assigning a group ID and unique index value, as described above) in conjunction with prior knowledge of the number of bits in each of the Nss sub-subfields 142-9-*a*, 142-9-*b*, 142-9-*c*, and 142-9-*d*. In an embodiment where the client station 25 performs interference mitigation, the client station 25 also determines the number of space-time streams for the other client stations 25 using the STBC subfield 142-5 in conjunction with knowledge of the unique index values assigned to the other client stations 25.

When two bits are allocated to each of the Nss sub-subfields 142-9-*a*, 142-9-*b*, 142-9-*c*, and 142-9-*d*, the Nss subfield 142-9 indicates whether 0, 1, 2, or 3 spatial streams are allocated to each of the client stations 25-1, 25-2, 25-3, and 25-4 of the WLAN 10, according to an embodiment. Alternatively, the Nss subfield 142-9 indicates another suitable range of numbers of spatial streams, in other embodiments. For example, the VHT-SIG2 135 indicates a modulation and coding scheme (MCS) for each of the client stations 25 using a sequence of bits for each client station 25, where one such sequence indicates that no data is being transmitted to the corresponding client station 25, in an embodiment. In this case, the two bits in each Nss sub-subfield are used to indicate whether 1, 2, 3, or 4 spatial streams are allocated to each of the client stations 25-1, 25-2, 25-3, and 25-4, according to an embodiment. In some other possible implementations of the VHT-SIG1 120, different numbers of bits are allocated to the Nss subfield 142-9. Additionally, the Nss subfield 142-9 indicates the numbers of spatial streams for more or less than four client stations 25, according to some embodiments. When the Nss subfield 142-9 indicates that zero space-time streams are allocated to any of the client stations 25, the corresponding client station or stations 25 disregards the remainder of the data unit 100, thereby saving power as described above.

The example bit allocation for VHT-SIG2 135 of FIG. 3B is implemented in conjunction with the example bit allocation shown in FIG. 3A, and/or with any other suitable bit allocation for the VHT-SIG1 120. The VHT-SIG2 135 includes a plurality of subfields 152. According to an embodiment, the plurality of subfields 152 includes an MCS subfield 152-1, a coding type subfield 152-2, a reserved subfield 152-3 (e.g., for implementing features developed in the future), a CRC subfield 152-4, and a subfield 152-5 including tail bits. The MCS subfield 152-1 specifies a modulation and coding scheme (MCS) that the AP 14 uses in generating and transmitting the space-time streams corresponding to each client station 25. By transmitting the VHT-SIG2 135 over different spatial channels and, optionally, using beamsteering, the AP 14 utilizes the MCS subfield 152-1 and other ones of the subfields 152 to transmit user-specific information for each client station 25.

Accordingly, the data unit 100 allows the indications of the MCS for each client station 25 to be included within the VHT-SIG2 135, while advantageously providing complete indications of the numbers of space-time streams for each client station 25 in the VHT-SIG1 120 using the STBC subfield 142-5 and the Nss subfield 142-9. Each of the client stations 25 processes the STBC subfield 142-5 and the Nss subfield 142-9 before receiving the VHT-LTFs 130. Therefore, each client station 25 is enabled to process, without buffering, only those ones of the received VHT-LTFs 130 that the client station 25 needs to determine the equalizer for its own space-time streams, according to an embodiment. In other embodiments, the client station 25 processes VHT-LTFs 130 that correspond to other stations for interference mitigation purposes, for example.

The client stations 25 each determines which ones of the space-time streams, and which ones of the VHT-LTFs 130, to process based on the unique index values assigned by the AP 14. According to an embodiment, the client stations 25 use the unique index values in conjunction with knowledge of a spatial mapping Q matrix in order to determine which space-time streams and which ones of the VHT-LTFs 130 to process.

According to another embodiment, the Nss subfield 142-9 specifies an index value which in turn specifies an entry in a lookup table (LUT). The LUT has a plurality of entries, and each entry indicates numbers of spatial streams for one or more client stations 25. The LUT therefore specifies suitable combinations of numbers of spatial streams that are allocated to the various client stations 25. In the example of FIG. 3A, the Nss subfield 142-9 includes eight bits and therefore specifies any of 256 different index values corresponding to 256 entries in the LUT, according to an embodiment. Of course, other suitable indications of a number of space-time streams are utilized in other embodiments.

FIGS. 7A and 7B are diagrams of example bit allocations for the VHT-SIG1 120 and the VHT-SIG2 135, according to an embodiment. The bit allocations of FIGS. 7A and 7B are similar to those of FIGS. 3A and 3B, except that the STBC subfield 142-5 is removed from the VHT-SIG1 120 and an STBC subfield 152-6 is included in the VHT-SIG2 135. Additionally, the Nss subfield 142-9 is replaced with an Nsts subfield 142-12, which indicates a number of space-time streams for each client station 25. In another embodiment, the Nsts subfield 142-12 indicates an index to a LUT having different combinations of space-time streams. The Nsts subfield 142-12 includes nine bits, according to the embodiment illustrated in FIG. 7A.

By indicating the number of space-time streams using the Nsts subfield 142-12, the STBC subfield 142-5 is not needed to determine the number of space-time streams for a particular client station 25. Because the PHY unit 20 is configured to generate different VHT-SIG2 135 data for simultaneous transmission to different client stations 25, including the STBC subfield 152-6, the VHT-SIG2 135 allows user-specific control of STBC settings. Therefore, in an embodiment, STBC may be used for the spatial streams corresponding to some of the client stations 25 but not for the spatial streams corresponding to other ones of the client stations 25.

In an embodiment, each client station 25 determines an equalizer for its space-time streams based on its number of space-time streams, and not based on the number of spatial streams corresponding to the client station 25. If the Nsts subfield 142-12 indicates, for example, that two space-time streams correspond to the client station 25, the same equalizer is determined regardless of whether STBC is not used and the number of spatial streams is two, or STBC is used and the number of spatial streams is one, according to an embodiment. If the STBC subfield 152-6 subsequently indicates that STBC is used, the client station 25 groups OFDM symbols together in pairs (e.g., one OFDM symbol from each space-time stream), for example, and performs STBC decoding after at least a portion of the equalization has been performed, according to an embodiment.

In some embodiments, use of the Nsts subfield 142-12 allows more bits in the VHT-SIG1 120 to be utilized for purposes other than indicating numbers of space-time streams. For example, the Nsts subfield 142-12 is implemented with eight or fewer bits, according to an embodiment. In such an embodiment, removing the STBC subfield 142-5 from the VHT-SIG1 120 results in fewer total bits in the VHT-SIG1 120 being used to indicate the numbers of space-time streams for the client stations 25 as compared to, for example, the bit allocation of FIG. 3A. In other embodiments, the Nsts subfield 142-12 or a similar subfield is included in the VHT-SIG1 120 along with the STBC subfield 142-5 or a similar subfield. Suitable alternatives to other embodiments of the data unit 100 and other data units, such as those embodiments described below, also include the Nsts subfield 142-12.

FIG. 8 is a diagram of still another example bit allocation for the VHT-SIG1 120 which is used when, for example, the L-SIGs 115 indicate the duration T of the data unit 100 after the legacy portion, in another embodiment. According to an embodiment, the rate subfield in the L-SIGs 115 is set to 6 Mbps, and the length subfield is set such that the rate and length subfields together indicate the duration T. The VHT-SIG1 120 therefore is implemented without the duration subfield 142-1, which thus frees twelve bits of the VHT-SIG1 120 for other uses, according to an embodiment. For example, as shown in FIG. 8, the STBC subfield 142-5 is implemented as a plurality of STBC sub-subfields 142-5-*a*, 142-5-*b*, 142-5-*c*, and 142-5-*d*, which are denoted STBC1, STBC2, STBC3, and STBC4, respectively. The STBC sub-subfields 142-5-*a*, 142-5-*b*, 142-5-*c*, and 142-5-*d* each corresponds to one of the client stations 25-1, 25-2, 25-3, and 25-4, according to an embodiment. Each of the STBC sub-subfields 142-5-*a*, 142-5-*b*, 142-5-*c*, and 142-5-*d* includes a single bit that indicates whether space-time streams for the corresponding client station 25 are encoded, using an Alamouti code for example, or whether STBC is not being used with the spatial streams for the corresponding client station 25, according to an embodiment. The example bit allocation of FIG. 8 therefore is used to indicate user-specific STBC settings in the VHT-SIG1 120 so that the STBC setting need not be the same for all of the client stations 25. According to an embodiment, the other excess bits in the example of FIG. 8, as compared to previous-discussed embodiments of the VHT-SIG1 120, are included in the MU reserved subfield 142-10. One of ordinary skill in the art will also recognize additional and/or alternative suitable uses for the excess bits in light of the teachings and disclosure herein.

According to various other embodiments, the AP 14 also operates in single-user (SU) mode, where the AP 14 supports downlink single-user wireless communication. The data unit 100 also is used to transmit information to a client station 25 in SU mode, in some embodiments. In SU mode, the VHT-SIG1 120 is implemented without some of the subfields 142 described above with respect to various embodiments in MU mode. According to some embodiments, the VHT-SIG2 135 is implemented without some of the subfields 152 in SU mode, or is removed altogether.

Figure 9A:
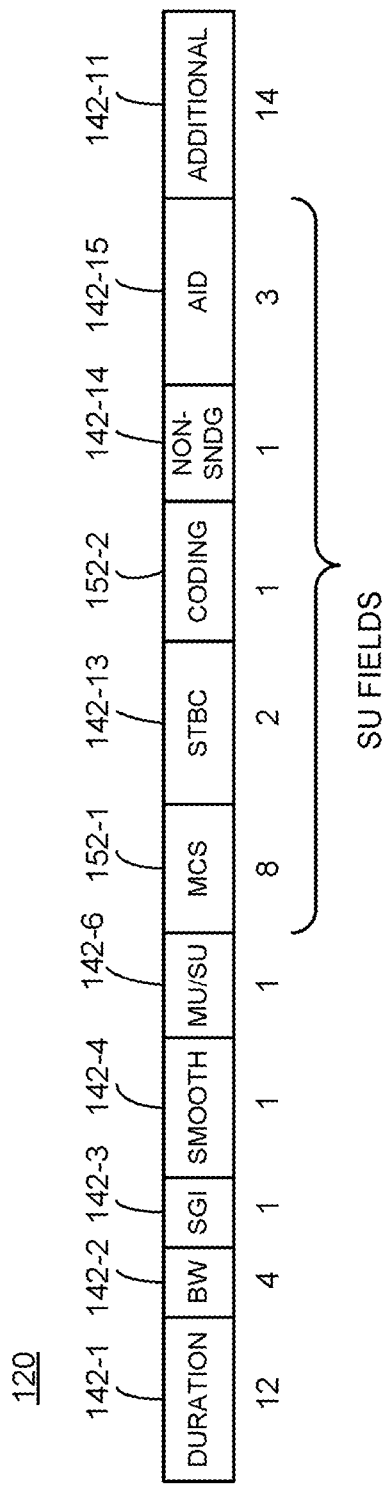
FIGS. 9A and 9B are diagrams of example bit allocations for a data unit, according to yet another embodiment.
Figure 9B:
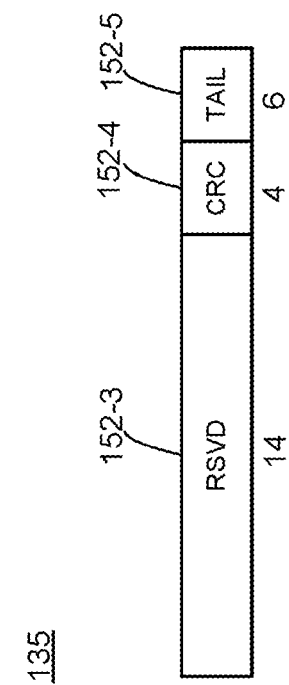

FIGS. 9A and 9B are diagrams of example bit allocations for the VHT-SIG1 120 and VHT-SIG2 135, respectively, for SU mode. As shown in FIG. 9A, the VHT-SIG1 120 includes the duration subfield 142-1, the bandwidth subfield 142-2, the SGI subfield 142-3, the smoothing subfield 142-4, the MU/SU subfield 142-6, the MCS subfield 152-1, an STBC subfield 142-13, the coding type subfield 152-2, a non-sounding subfield 142-14, an AID subfield 142-15, and the additional subfields 142-11 (such as a CRC subfield and a subfield including tail bits), in an embodiment. The AP 14 indicates that the data unit 100 is being transmitted in SU mode by way of setting the bit in the MU/SU subfield 142-6 to a logic "0", according to an embodiment.

According to another embodiment, the MU/SU subfield 142-6 is removed, and the VHT-SIG1 120 includes the group ID subfield 142-7 in both MU mode and SU mode. Therefore, the group ID subfield 142-7 is set to a reserved bit sequence to indicate that the data unit 100 is an SU data unit, in an embodiment.

In SU mode, the VHT-SIG1 120 is implemented without the group ID subfield 142-7, the resolvable LTF subfield 142-8, and the Nss subfield 142-9, according to an embodiment. That is, the data unit 100 does not specify an MU group when supporting SU communication, and enough bits are then freed in the VHT-SIG1 120 to indicate the number of space-time streams for the single client station 25 using the MCS subfield 152-1, thus rendering the Nss subfield 142-9 unnecessary.

In particular, the MCS subfield 152-1 is implemented so that it indicates a number of spatial streams for a client station 25 involved in SU communication, according to an embodiment. This indication is used together with an STBC setting indicated by the STBC subfield 142-13 to provide a complete indication of the number of space-time streams transmitted from the AP 14 to the client 25. By providing this indication in the VHT-SIG1 120 for SU mode as well, one or more embodiments enable the client station 25 to begin estimating the signal channel between the AP 14 and the client station 25 substantially contemporaneously with receipt of the VHT-LTFs 130. The client station 25 determines that the AP 14 is communicating in SU mode based on the group ID subfield 142-7 or any other suitable aspect of the structure of the data unit 100, such as the MU/SU subfield 142-6, in some embodiments. The client station 25 then performs signal channel estimation using all or a portion of the VHT-LTFs 130. For example, some of the VHT-LTFs 130 may be repeated, and the client station 25 may therefore perform signal channel estimation using less than all of the VHT-LTFs 130, according to an embodiment.

In yet another embodiment, the Nss subfield 142-9 is not removed, and the VHT-SIG1 120 therefore includes indications of each of the number of spatial streams, the MCS, and the STBC setting in separate subfields. For example, the AID subfield 142-15, or one or more bits from any other suitable subfield or subfields, is/are removed from the example bit allocation of FIG. 9A to allow a sufficient number of bits for the Nss subfield 142-9. In yet another embodiment, as with various other example bit allocations described herein, the Nss subfield 142-9 is replaced with the Nsts subfield 142-12.

Using the STBC subfield 142-13, the AP 14 may have more options for implementing STBC in SU mode. For example, in FIG. 9A, the VHT-SIG1 120 has enough otherwise-unused bits such that the STBC subfield 142-13 includes two bits instead of the single bit in the STBC subfield 142-5. With two bits identifying up to four possible STBC settings, the AP 14 is able to choose between no STBC at all, an Alamouti code, and two higher-order codes, according to an embodiment.

The VHT-SIG1 120 also has enough otherwise-unused bits to include PHY information that is not included in either the VHT-SIG1 120 or the VHT-SIG2 135 in MU mode, in an embodiment. For example, the bit allocation of FIG. 9A includes one bit for the not-sounding subfield 142-14 and three bits for the AID subfield 142-15. The not-sounding subfield 142-14 indicates whether the data unit 100 is a sounding packet, for example. The AID subfield 142-15 includes the last three bits of the MAC ID or AID of a client station to which the data unit 100 is being transmitted, in some embodiments. Accordingly, the PHY unit 29 of a client station 25 stops attempting to receive and decode for the duration of the data unit 100 if the PHY unit 29 determines that the AID subfield 142-15 does not match the last three bits of the AID of the client station 25. In this manner, the PHY unit 29 of the client station 25 determines early in the reception of the data unit 100 that the SU transmission is not intended for the client station 25, and conserves power, for example, by not attempting to receive and decode.

The VHT-SIG2 135 includes the reserved subfield 152-3, the CRC subfield 152-4, and the subfield 152-5 including tail bits. Alternatively, if the reserved subfield 152-3 is not needed to implement any additional features, the VHT-SIG2 135 is simply eliminated from the data unit 100, according to an embodiment.

Figure 10A:
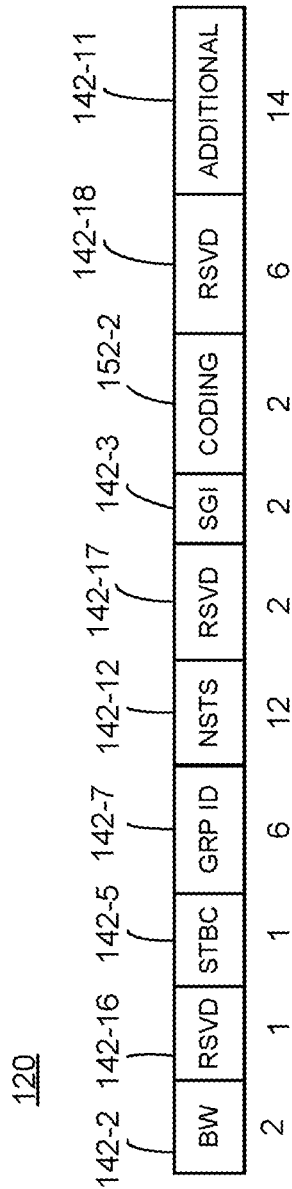
FIGS. 10A-10C are diagrams of example bit allocations for a data unit, according to still another embodiment.
Figure 10B:
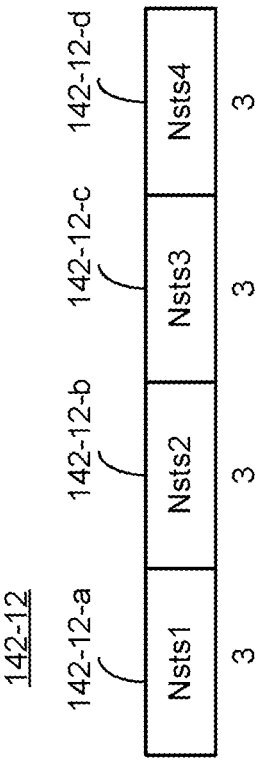
Figure 10C:
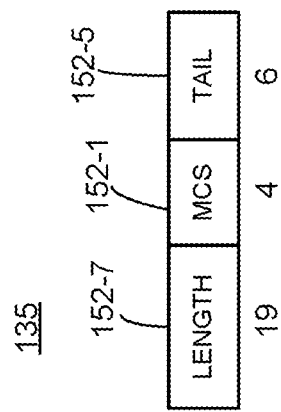

FIGS. 10A-10C are diagrams of example bit allocations for the VHT-SIG1 120 and the VHT-SIG2 135 for use in MU mode, according to yet another embodiment. As shown in FIG. 10A, the VHT-SIG1 120 includes the bandwidth subfield 142-2, a reserved subfield 142-16, the STBC subfield 142-5, the group ID subfield 142-7, the Nsts subfield 142-12, another reserved subfield 142-17, the SGI subfield 142-3, the coding subfield 152-2, still another reserved subfield 142-18, and the additional subfields 142-11. The VHT-SIG1 120 does not include the duration subfield 142-1, for example. In an embodiment, the duration T of the data unit 100 after the legacy portion is indicated by the rate and length subfields in the L-SIGs 115, such as in the manner described with respect to FIG. 8.

The bandwidth subfield 142-2 includes two bits to indicate one of four possibilities for the bandwidth of the data unit 100. For example, the bandwidth subfield 142-2 indicates that the bandwidth of the data unit 100 is 20 MHz, 40 MHz, 80 MHz, or 160 MHz (either contiguous or two 80 MHz bands), in an embodiment. The reserved subfield 142-16 includes a single bit set to a logic "1", according to an embodiment. The reserved subfield 142-16 is, for example, reserved for possible expansion of the bandwidth subfield 142-2. The STBC subfield 142-5 includes a single bit indicating whether or not the data unit 100 is encoded using STBC, as described above, in an embodiment. According to an embodiment, the group ID subfield 142-7 is implemented using six bits, and is used to indicate that the data unit 100 is, for example, an SU data unit, as described further below.

The reserved subfields 142-17 and 142-18 include two bits and six bits, respectively, all of which are set to a logic "1", according to an embodiment. The SGI subfield 142-3 includes two bits, one of which is used to indicate whether the guard interval of the data unit 100 is long or short, and one of which is used for short GI packet length ambiguity mitigation, according to an embodiment. The coding subfield 152-2 includes two bits, at least one of which is used to indicate a coding type used for the data unit 100, such as a binary convolutional code (BCC) or a low-density parity-check (LDPC) code, in an embodiment.

According to an embodiment, the Nsts subfield 142-12 is implemented using twelve bits, and includes Nsts sub-subfields 142-12-a, 142-12-b, 142-12-c, and 142-12-d to provide an indication of up to four numbers of space-time streams for up to four respective client stations 25, as shown in FIG. 10C. Each of the Nsts sub-subfields 142-12-a, 142-12-b, 142-12-c, and 142-12-d includes, for example, three bits. According to an embodiment, five possible combinations of the three bits in each of the Nsts sub-subfields 142-12-a, 142-12-b, 142-12-c, and 142-12-d are used to indicate that either zero, one, two, three, or four space-time streams correspond to the respective client station 25. Of course, other numbers of possible combinations are used in the Nsts sub-subfields 142-12-a, 142-12-b, 142-12-c, and 142-12-d in other embodiments, such as six possible combinations, seven possible combinations, eight possible combinations, four possible combinations, etc.

As shown in FIG. 10B, the VHT-SIG2 135 includes a length subfield 152-7, the MCS subfield 152-1, and the subfield 152-5 including tail bits. In an embodiment, the length subfield 152-7 specifies the length of useful data in the physical layer service data unit (PSDU) in units of four octets.

Figure 11A:
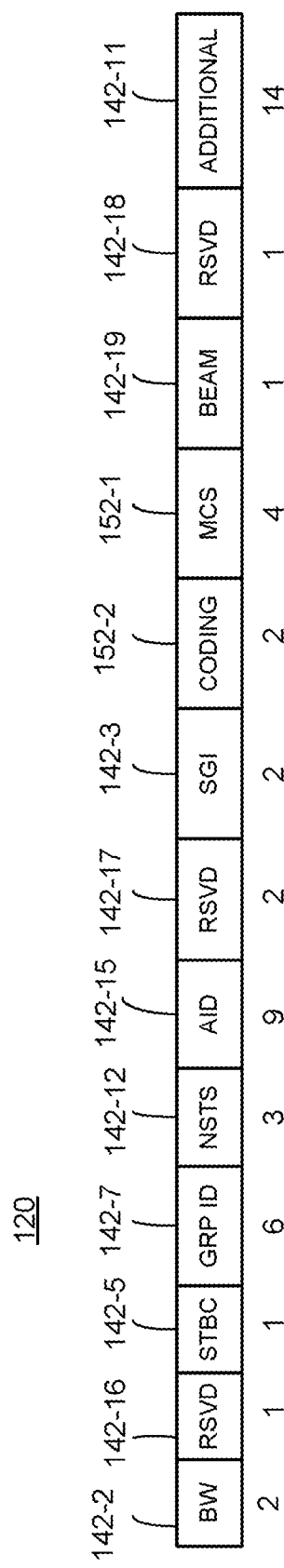
FIGS. 11A and 11B are diagrams of example bit allocations for a data unit, according to yet another embodiment.
Figure 11B:
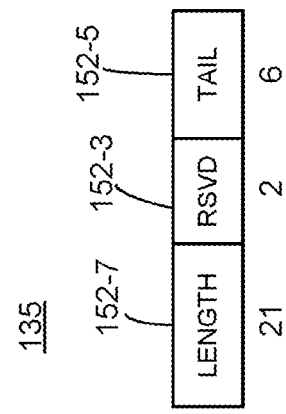

FIGS. 11A and 11B are diagrams of example bit allocations for the VHT-SIG1 120 and the VHT-SIG2 135 for use in SU mode, according to still another embodiment. As shown in FIG. 11A, the VHT-SIG1 120 includes the bandwidth subfield 142-2, the reserved subfield 142-16, the STBC subfield 142-5, the group ID subfield 142-7, the Nsts subfield 142-12, the AID subfield 142-15, the reserved subfield 142-17, the SGI subfield 142-3, the coding subfield 152-2, the MCS subfield 152-1, a beamforming subfield 142-19, the reserved subfield 142-18, and the additional subfields 142-11. As shown in FIG. 11B, the VHT-SIG2 135 includes the length subfield 152-7, the reserved subfield 152-3, and the subfield 152-5 including tail bits.

Thus, the VHT-SIG1 120 and the VHT-SIG2 135 have bit allocations similar to the MU mode bit allocations of FIGS. 10A and 10B, with several differences which, among other benefits, exploit the increased number of available bits, particularly in the VHT-SIG1 120.

For example, in an embodiment, the Nsts subfield 142-12 in the VHT-SIG1 120 includes only three bits, compared to the twelve bits allocated in the example of FIG. 10A. The nine bits that are freed up by the smaller size of the Nsts subfield 142-12 in FIG. 11A are allocated to the AID subfield 142-15. As described with respect to FIG. 9A, the AID subfield 142-15 includes bits from the MAC ID or AID of a client station to which the data unit 100 is being transmitted in SU mode, according to some embodiments. For example, in the bit allocation of FIG. 11A, the AID subfield 142-15 includes the last nine bits of the AID of the client station to which the data unit 100 is being transmitted. In an embodiment, the PHY unit 29 of a client station 25 therefore stops attempting to receive and decode for the duration of the data unit 100, and consequently conserves power, if the PHY unit 29 determines that the AID subfield 142-15 does not match the last nine bits of the AID of the client station 25 (i.e., if the PHY unit 29 determines that the data unit 100 is not intended for the client station 25).

According to an embodiment, the three bits in the Nsts subfield 142-12 are used to indicate one of eight possible numbers of space-time streams for the client station receiving the data unit 100, such as the client station 25. For example, the three bits in the Nsts subfield 142-12 indicate whether data is transmitted to the client station 25 using one, two, three, four, five, six, seven, or eight space-time streams.

As noted above, the VHT-SIG1 120 also includes the MCS subfield 152-1 in the example of FIG. 11A, unlike in an MU mode transmission such as that described with respect to FIGS. 10A-10C. Additionally, in SU mode, the beamforming subfield 142-19 includes a single bit to indicate whether a beamforming steering matrix is applied to the data unit 100, in an embodiment.

In an embodiment, the VHT-SIG1 120 includes the group ID subfield 142-7 in both MU mode and SU mode, and the group ID subfield 142-7 is set to a reserved bit sequence such as, for example, the sequence where every bit in the group ID subfield 142-7 is a logic "1", to indicate that the data unit 100 is an SU data unit. In an embodiment, the group ID subfield 142-7 is also set to the reserved bit sequence when the data unit 100 is a broadcast frame and when the data unit 100 is an MU data unit but one or more of the client stations 25 have not been assigned to an MU group.

As further noted above, the VHT-SIG2 135 includes the reserved subfield 152-3 in the example of FIG. 11B. In particular, in at least some SU mode embodiments, bits are allocated to the reserved subfield 152-3 because the MCS subfield 152-1 is included in the VHT-SIG1 120 instead of the VHT-SIG2 135.

Figure 12:
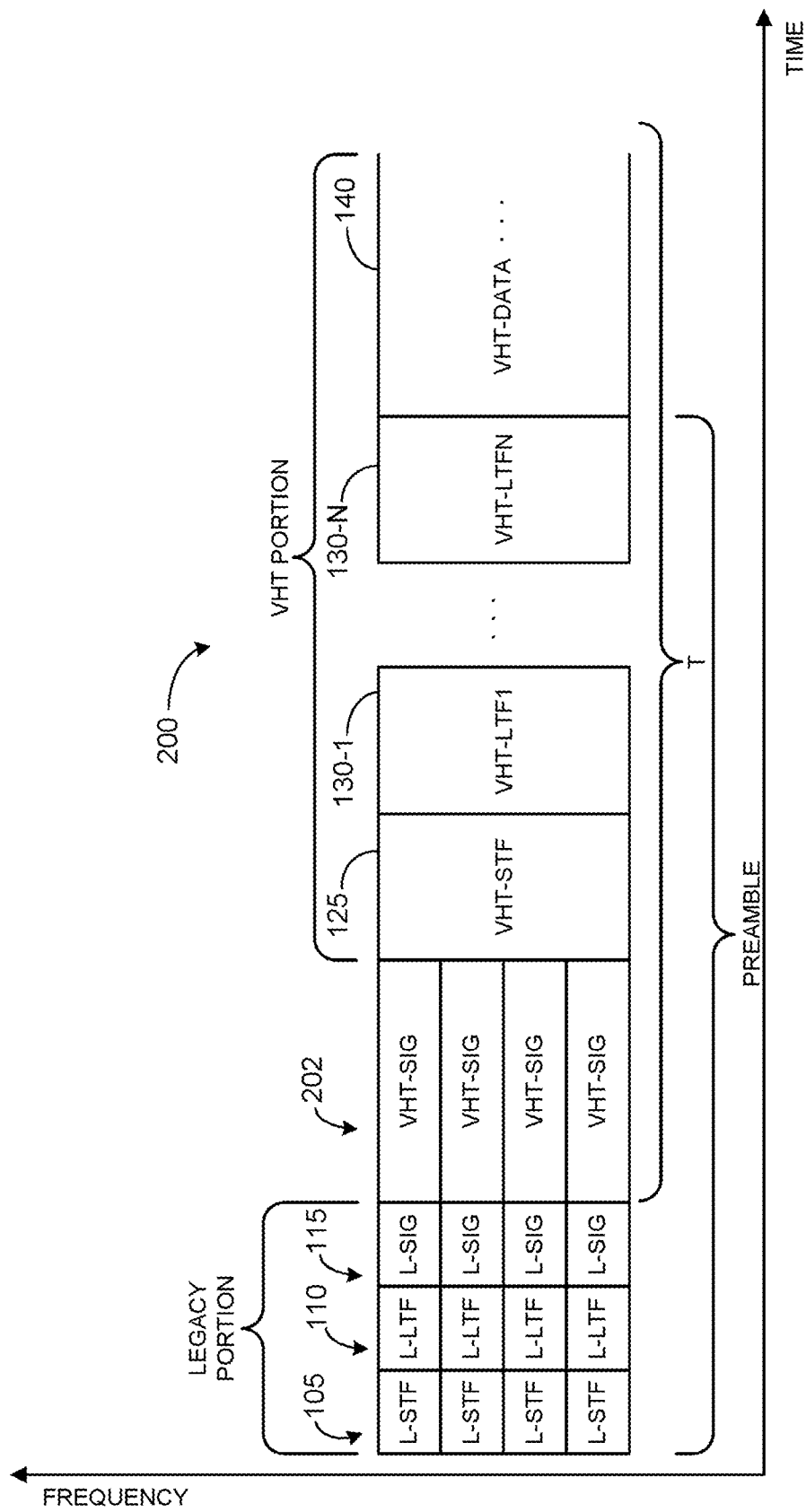
FIG. 12 is a diagram of another example data unit format, according to still another embodiment.

FIG. 12 is a diagram of a data unit 200 that the AP 14 is configured to transmit to the client stations 25 using orthogonal frequency division multiplexing (OFDM) modulation, according to another embodiment. One or more of the client stations 25 is also configured to transmit a data unit formatted according to the format of the data unit 200 to the AP 14, in an embodiment. The data unit 200 conforms to the VHT protocol and occupies an 80 MHz band, in an embodiment. In other embodiments, the data unit 200 occupies a different bandwidth such as discussed with reference the data unit 100. The data unit 200 is similar to the data unit 100, but a preamble of the data unit 200 includes four very high throughput signal fields (VHT-SIGs) 202 in place of both the VHT-SIG1s 120 and the VHT-SIG2s 135.

In the data unit 200, content from both the VHT-SIG1 120 and the VHT-SIG2 135 discussed above is included in the VHT-SIGs 202 as further described below. In at least some examples, the VHT-SIGs 202 are collectively referred to as a single very high throughput signal field (VHT-SIG) 202. The VHT-SIG 202 includes three OFDM symbols, according to an embodiment. By providing the VHT-SIG 202 as a unified very high throughput signal field, less bits are utilized as compared to the separate VHT-SIG1 120 and the VHT-SIG2 135 discussed above, and thus more bits are available for signaling other PHY information, in an embodiment. In particular, both the VHT-SIG1 120 and the VHT-SIG2 135 require a set of protection bits at the end thereof, e.g., one or more of the additional subfields 142-11 in the VHT-SIG1 120 and one or both of the CRC subfield 152-4 and the subfield 152-5 including tail bits in the VHT-SIG2 135. Because the single VHT-SIG 202, like each of the VHT-SIG1 120 and the VHT-SIG2 135, has one set of protection bits, other bits are made available that may otherwise have been used as protection bits in the VHT-SIG2 135.

FIGS. 13A and 13B are diagrams of an example bit allocation of the VHT-SIG 202, according to an embodiment. As shown in FIG. 13A, in MU mode, the VHT-SIG 202 includes the duration subfield 142-1, the bandwidth subfield 142-2, the SGI subfield 142-3, the smoothing subfield 142-4, the MU/SU subfield 142-6, a plurality of MU subfields 204, and the additional subfields 142-11, such as a CRC subfield and a subfield including tail bits. As shown in FIG. 13B, the plurality of MU subfields 204 include the group ID subfield 142-7, the resolvable LTF subfield 142-8, a plurality of MU-MCS subfields 204-1, an STBC subfield 204-2, a coding type subfield 204-3, and the MU reserved subfield 142-10.

The plurality of MU-MCS subfields 204-1 include MU-MCS sub-subfields 204-1-a, 204-1-b, 204-1-c, and 204-1-d, which are denoted MU-MCS1, MU-MCS2, MU-MCS3, and MU-MCS4, respectively. The MU-MCS sub-subfields 204-1-a, 204-1-b, 204-1-c, and 204-1-d each corresponds to one of the client stations 25-1, 25-2, 25-3, and 25-4, according to an embodiment. According to an embodiment, each of the MU-MCS sub-subfields 204-1-a, 204-1-b, 204-1-c, and 204-1-d includes five bits, and indicates a modulation and coding scheme being used for the corresponding client station 25. Of the 32 possible different sequences of five bits, one sequence is used to indicate that no data is being transmitted to the corresponding client station 25, in an embodiment. Therefore, any of 31 different MCSs are used for each client station 25, according to an embodiment. According to another embodiment, less than 31 different MCSs may be available for use, and the number of bits allocated to each of the MU-MCS subfields 204-1 is correspondingly reduced.

The MU-MCS subfields 204-1 are implemented so that they each indicate a number of spatial streams for a respective client station 25, along with an indication of the modulation and coding scheme for the respective client station 25, according to an embodiment. The STBC subfield 204-2 also provides an indication of user-specific STBC settings in the VHT-SIG 202. For example, the STBC subfield 204-2 includes four bits, where each bit is used to indicate whether STBC is being used for the spatial streams corresponding to a respective one of the client stations 25. Accordingly, the additional usable bits in the VHT-SIG 202 allow user-specific control of both MCSs and STBC settings, in an embodiment. According to an embodiment, the coding type subfield 204-3 is implemented in a manner similar to the STBC subfield 204-2 to allow user-specific control of coding type.

In a manner similar to various embodiments described above, the MU-MCS subfields 204-1, and the bits within the STBC subfield 204-2, are ordered according to unique index values assigned to the client stations 25 by the AP 14. Therefore, the MU-MCS subfields 204-1 are used together with the STBC subfield 204-2 to provide a complete indication of the number of space-time streams transmitted from the AP 14 to each of the client stations 25.

Figure 14A:
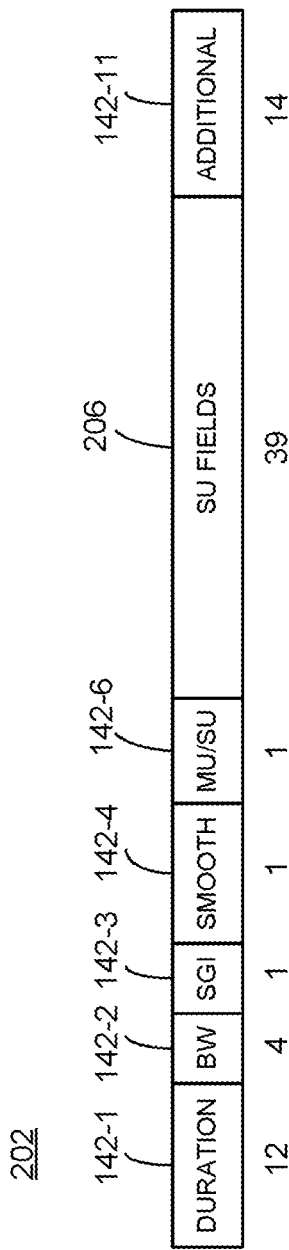
FIGS. 14A and 14B are diagrams of yet another example bit allocation for a data unit, according to an embodiment.
Figure 14B:
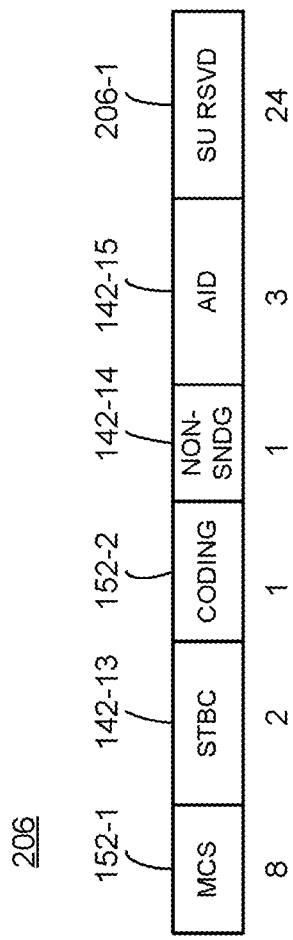

FIGS. 14A and 14B are diagrams of an example bit allocation of the VHT-SIG 202 in SU mode, according to an embodiment. As shown in FIG. 14A, the VHT-SIG 202 includes the duration subfield 142-1, the bandwidth subfield 142-2, the SGI subfield 142-3, the smoothing subfield 142-4, the MU/SU subfield 142-6, a plurality of SU subfields 206, and the additional subfields 142-11, such as a CRC subfield and a subfield including tail bits, in an embodiment. As shown in FIG. 14B, the plurality of SU subfields 206 includes the MCS subfield 152-1, the STBC subfield 142-13, the coding type subfield 152-2, the non-sounding subfield 142-14, the AID subfield 142-15, and an SU reserved subfield 206-1.

In an embodiment, the MU/SU subfield 142-6 is removed in both MU and SU mode, and the VHT-SIG 202 includes the group ID subfield 142-7 in both MU mode and SU mode. Therefore, the group ID subfield 142-7 is set to a reserved bit sequence to indicate that the data unit 200 is an SU data unit, in an embodiment.

The MCS subfield 152-1, the STBC subfield 142-13, the coding type subfield 152-2, the non-sounding subfield 142-14, and the AID subfield 142-15 are implemented in a similar manner as discussed above with respect to FIG. 9A, for example. The SU reserved subfield 206-1 includes bits allocated for implementation of future SU features. According to an embodiment, the AID subfield 142-15 includes more than three bits in order to improve differentiation among client stations, thereby allowing the PHY unit 29 of a client station 25 to more reliably determine that the AID subfield 142-15 does not correspond to the client station 25 (e.g., to an AID of the client station 25) and, in response, shut down for the duration of the data unit 200. The SU reserved subfield 206-1 may include fewer than 24 bits when the AID subfield 142-15 includes more than three bits.

In at least some embodiments and/or situations, one or more advantages are realized by using the data unit 200 and, in particular, the unified VHT-SIG 202 therein. As described above, bit savings is achieved, in at least some embodiments, thereby allowing other information, such as more user-specific information in an MU scenario, to be signaled in the VHT-SIG 202. In some cases, the bit savings eliminate the need to implement an LUT in connection with, for example, the Nss subfield 142-9 or the Nsts subfield 142-12. Consequently, processing delay and complexity resulting from searching such an LUT is reduced, in some embodiments. Implementation of the PHY unit 29 of each client station 25 also is simplified, in some embodiments, because of the simpler demodulation and decoding attendant to a data unit having a single signal field as opposed to multiple signal fields (e.g., the VHT-SIG1 120 and the VHT-SIG2 135). Additionally, the VHT-SIG 202 allows a single preamble structure to be used for both SU and MU situations, in some embodiments, whereas in some embodiments described above, the VHT-SIG2 135 is used in MU situations but eliminated in SU situations. In MU situations, the VHT-SIG 202 also enables each client station 25 to perform more advanced interference mitigation (or "whitening"), because the constellation of interference for the client station 25 is more well-known by virtue of the client station 25 receiving all very high throughput signal field information via the omnidirectional VHT-SIG 202, in an embodiment. The VHT-SIG2 135, on the other hand, is beam-steered to different client stations 25 in some embodiments, as discussed above. Consequently, in some embodiments, the VHT-SIG 202 is decoded more reliably than the combination of the VHT-SIG1 120 and the VHT-SIG2 135. The VHT-SIG 202 also allows more reserved bits for both MU and SU situations, and therefore better accommodates foreseeable, yet-to-be-developed advanced features, in some embodiments.

Figure 15:
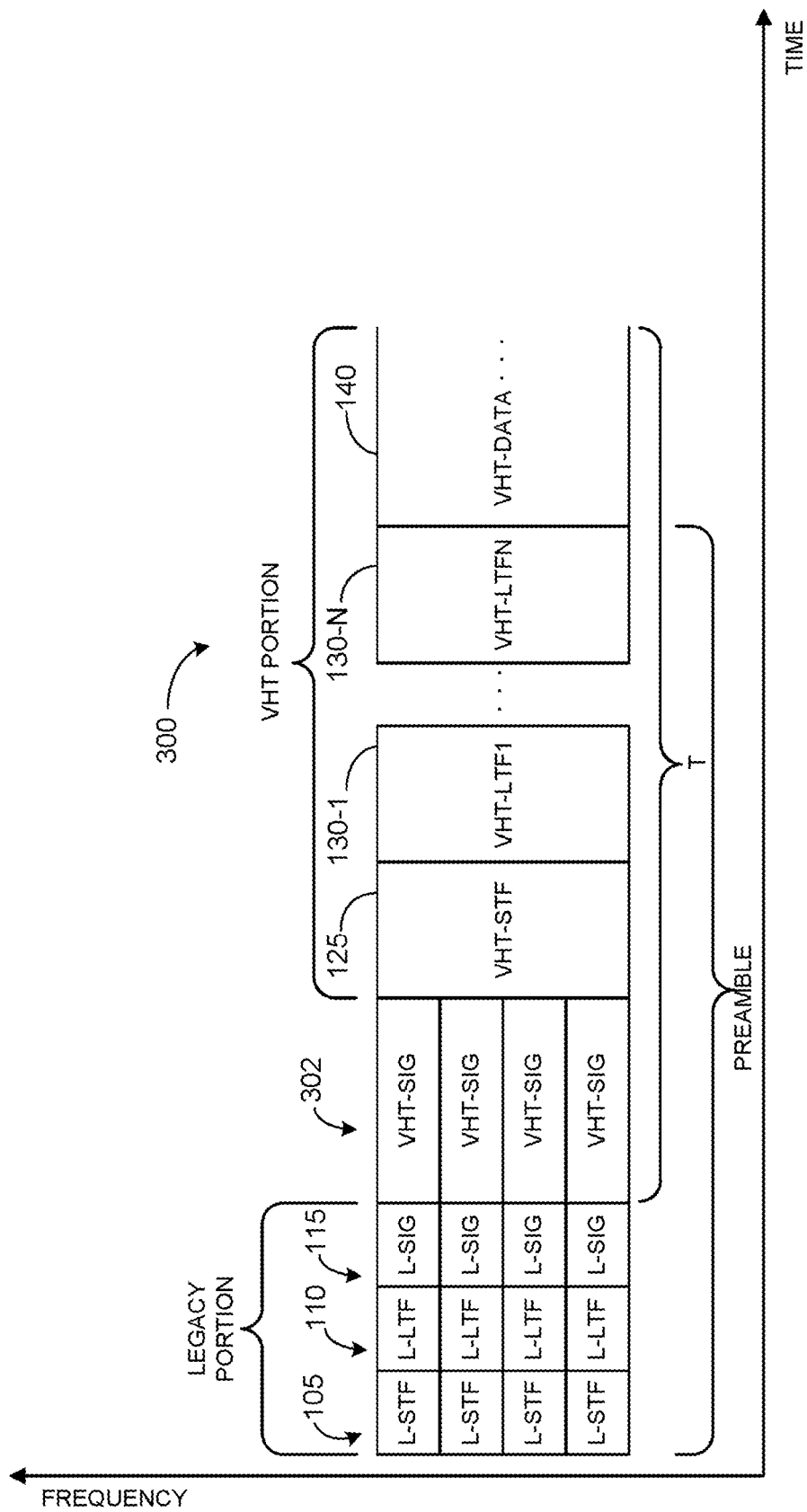
FIG. 15 is a diagram of yet another example data unit format, according to an embodiment.

FIG. 15 is a diagram of yet another data unit 300 that the AP 14 is configured to transmit to the client stations 25 using orthogonal frequency division multiplexing (OFDM) modulation, according to another embodiment. One or more of the client stations 25 also are configured to transmit a data unit formatted according to the format of the data unit 300 to the AP 14. The data unit 300 conforms to the VHT protocol and occupies an 80 MHz band, in an embodiment. In other embodiments, the data unit 300 occupies a different bandwidth such as discussed with reference the data unit 100. The data unit 300 is similar to the data unit 200, but a preamble of the data unit 300 includes four very high throughput signal fields (VHT-SIGs) 302 instead of the VHT-SIG 202.

In at least some examples, the VHT-SIGs 302 are collectively referred to as a single very high throughput signal field (VHT-SIG) 302. The VHT-SIG 302 has a different format than the VHT-SIG 202, as discussed below.

According to an embodiment, the VHT-SIG 302 includes only two OFDM symbols, as compared to three OFDM symbols for the VHT-SIG 202 of FIG. 12. The L-SIGs 115 are used to indicate the duration T of the data unit 300 after the legacy portion by appropriately setting the rate and length subfields in the L-SIGs 115, such as in a manner similar to that described above with respect to FIG. 8. As a result, the twelve bits of the duration subfield 142-1 are not included in the VHT-SIG 302, and bits are allocated to the remaining subfields of the VHT-SIG 302 such that only two OFDM symbols are utilized for transmission of the VHT-SIG 302.

FIG. 16 is a diagram of an example bit allocation for the VHT-SIG 302 in MU mode. The VHT-SIG 302 includes the bandwidth subfield 142-2, the SGI subfield 142-3, the smoothing subfield 142-4, the STBC subfield 142-5, the non-sounding subfield 142-14, the coding type subfield 152-2, the group ID subfield 142-7, the MU-MCS subfields 204-1, the MU reserved subfield 142-10, and the additional subfields 142-11.

As in the example bit allocation of FIGS. 13A and 13B, the MU-MCS subfields 204-1 are implemented so that they each indicate a number of spatial streams for a respective client station 25, along with an indication of the modulation and coding scheme for the respective client station 25, according to an embodiment. The STBC subfield 142-5 indicates an STBC setting that is common to all of the client stations 25, according to an embodiment. Therefore, the MU-MCS subfields 204-1 are used together with the STBC subfield 142-5 to provide a complete indication of the number of space-time streams transmitted from the AP 14 to each of the client stations 25, while using only two OFDM symbols to transmit the entire very high throughput signal content of the preamble.

Figure 17:
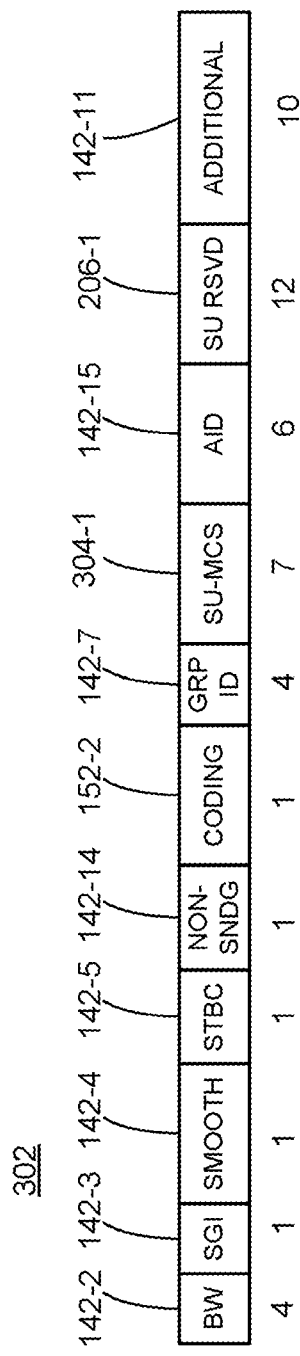
FIG. 17 is a diagram of still another example bit allocation for a data unit, according to an embodiment.

FIG. 17 is a diagram of an example bit allocation for the VHT-SIG 302 in SU mode. The VHT-SIG 302 includes the bandwidth subfield 142-2, the SGI subfield 142-3, the smoothing subfield 142-4, the STBC subfield 142-5, the non-sounding subfield 142-14, the coding type subfield 152-2, the group ID subfield 142-7, an SU-MCS subfield 304-1, the AID subfield 142-15, the SU reserved subfield 206-1, and the additional subfields 142-11.

Accordingly, the preamble of the data unit 300 is formatted in substantially the same manner for both SU mode and MU mode, allowing for greater simplicity in the design of the PHY units 29 for the client stations 25. For example, the group ID subfield 142-7 is included for both SU mode and MU mode. According to an embodiment, the group ID subfield 142-7 is set to a particular reserved bit sequence, such as the sequence having every bit set to a logic "0", to indicate SU mode, and MU mode is indicated any time the group ID subfield 142-7 differs from the reserved sequence, such as when the group ID subfield 142-7 has one or more bits set to a logic "1". In another embodiment, the MU/SU subfield 142-6 is included in both MU and SU mode, and the group ID subfield 142-7 is removed in SU mode.

The SU-MCS subfield 304-1 is implemented such that it indicates a number of spatial streams, along with an indication of a modulation and coding scheme, for a client station to which the data unit 300 is transmitted in SU mode, according to an embodiment. The SU-MCS subfield 304-1 is used together with the STBC subfield 142-5 to indicate the number of space-time streams transmitted from the AP 14 to the intended client station.

As described with respect to FIGS. 9A and 9B, the AID subfield 142-15 allows early shut down of the PHY unit 29 of a client station 25 if the PHY unit 29 determines that the client station 25 is not the client station for which the SU transmission is intended, according to an embodiment.

The same or similar preambles as described with respect to each of the data units 100, 200, and 300 are usable for uplink (UL) MIMO transmissions as well. For MU mode operation using the data unit 100, the AP 14 sends an uplink start indication (USI) frame to the client stations 25. The USI frame indicates all of the PHY information for each client station 25 except for user-specific information that each client station 25 includes in a beam-steered very high throughput signal field (e.g., the VHT-SIG2 135), such as an MCS, STBC setting, coding type, etc. According to an embodiment, the client stations 25 do not control any PHY information in UL-MIMO transmissions that is not included in the VHT-SIG2 135 or a similar beam-steered signal field. Instead, any information included in a signal field common to all the client stations 25 (e.g., the VHT-SIG1 120) is required to be controlled by the AP 14, because the AP 14 is better suited to determine conditions of other client stations 25, in an embodiment. For example, the AP 14 may know interference levels across all of the client stations 25, the received signal strength for UL transmissions by each client station 25, the transmit power of each client station 25, etc. Accordingly, in data units such as the data units 200 and 300, where all very high throughput signal field information is omnidirectional, the AP 14 controls information such as the MCS, STBC setting, etc., which is included in the VHT-SIG 202 or the VHT-SIG 302, for example.

Figure 18:
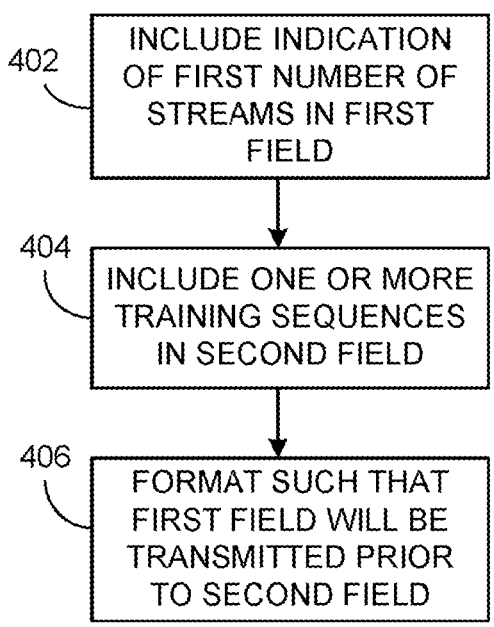
FIG. 18 is a flow chart of an example method for generating a preamble of a data unit for transmission via a communication channel, according to an embodiment.

FIG. 18 is a flow chart of an example method 400 for generating a preamble of a data unit for transmission via a communication channel, according to an embodiment. The method 400 will be described with reference to various embodiments of the WLAN 10 and the data units 100, 200, and 300, for ease of explanation. It will be understood, however, that the method 400 is used in networks other than the WLAN 10, and/or is used to generate a preamble of a data unit other than the data units 100, 200, and 300, in some embodiments. Additionally, the PHY unit 20 is configured to perform the method 400, in an embodiment. However, it will be understood that other devices are configured to perform the method 400 in other embodiments. As just one example, the MAC unit 18 is configured to perform at least a portion of the method 400, in an embodiment. It will further be understood that the PHY unit 20 is configured to perform methods other than the method 400, in some embodiments.

At block 402, an indication of a first number of spatial or space-time streams is included in a first field of the preamble. The indication of the first number of streams corresponds to transmission of the data unit to a first receiver, e.g., the client station 25-1. The first field of the preamble is the VHT-SIG1 120, in one embodiment. In another embodiment, the first field is the VHT-SIG 202. In yet another embodiment, the first field is the VHT-SIG 302.

At block 404, one or more training sequences are included in a second field of the preamble. The indication of the first number of streams indicates that a first set of the one or more training sequences in the second field, e.g., a first set of the VHT-LTFs 130, corresponds to the first receiver.

At block 406, the preamble is formatted such that the first field of the preamble will be transmitted prior to the second field of the preamble being transmitted. Accordingly, the client station 25-1 receives the indication of the first number of spatial or space-time streams, and therefore the indication that the first set of the VHT-LTFs 130 corresponds to the client station 25-1, before receiving the VHT-LTFs 130, according to an embodiment.

One of ordinary skill in the art will recognize suitable variations of the method 400 in light of the teaching and disclosure herein. For example, in some embodiments, one or more features shown in FIG. 18 are not performed, and/or one or more additional features not shown in FIG. 18 are performed. In another example, the order shown in FIG. 18 does not indicate the order in which the method 400 is performed, and/or does not indicate that each block is completed before another block begins.

Figure 19:
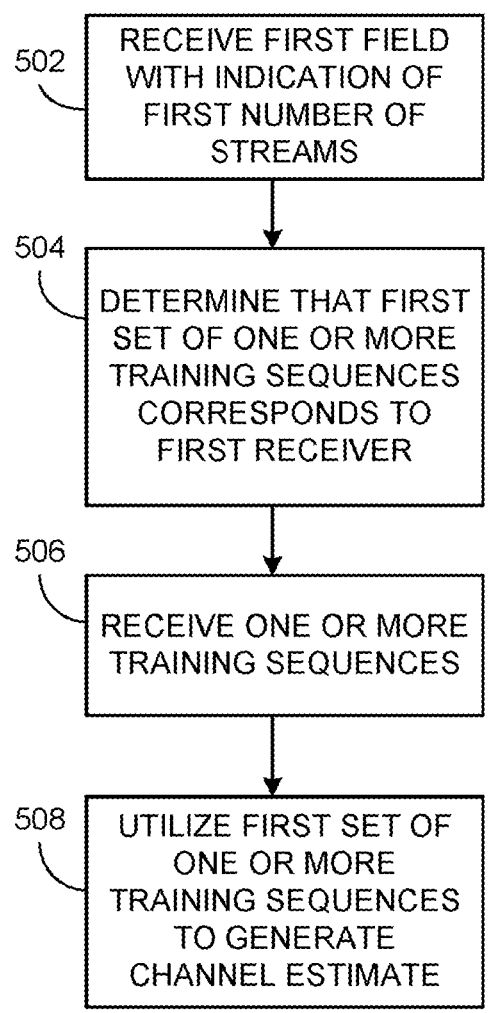
FIG. 19 is a flow chart of an example method for receiving a preamble of a data unit via a communication channel, according to an embodiment.

FIG. 19 is a flow chart of an example method 500 for receiving a preamble of a data unit via a communication channel using a first receiver, according to an embodiment. The method 500 will be described with reference to various embodiments of the WLAN 10 and the data units 100, 200, and 300, for ease of explanation. It will be understood, however, that the method 500 is used in networks other than the WLAN 10, and/or is used to receive a preamble of a data unit other than the data units 100, 200, and 300, in some embodiments. Additionally, the PHY unit 29 is configured to perform the method 500, in an embodiment. However, it will be understood that other devices are configured to perform the method 500 in other embodiments. It will further be understood that the PHY unit 29 is configured to perform methods other than the method 500, in some embodiments.

At block 502, a first field of the preamble is received. The first field includes an indication of a first number of spatial or space-time streams of the data unit which correspond to the first receiver, e.g., the client station 25-1.

At block 504, it is determined that a first set of one or more training sequences in a second field of the preamble corresponds to the first receiver. Accordingly, upon receiving the second field of the preamble, the client station 25-1 already knows which ones of the VHT-LTFs 130 correspond to the client station 25-1, according to an embodiment. The determination at block 504 is made in any of various suitable ways, such as in one of the example ways described above, according to various embodiments.

At block 506, the one or more training sequences of the second field of the preamble are received.

At block 508, the first set of the one or more training sequences is utilized to generate an estimate of at least a portion of the communication channel. In an embodiment, at least a portion of block 508 is performed while performing block 506. Accordingly, the method 500 allows the communication channel to be estimated earlier by virtue of providing a way to determine that the first set of the one or more training sequences corresponds to the first receiver, before receiving the one or more training sequences, in an embodiment.

One of ordinary skill in the art will recognize suitable variations of the method 500 in light of the teaching and disclosure herein. For example, in some embodiments, one or more features shown in FIG. 19 are not performed, and/or one or more additional features not shown in FIG. 19 are performed. In another example, the order shown in FIG. 19 does not indicate the order in which the method 500 is performed, and/or does not indicate that each block is completed before another block begins.

Figure 20:
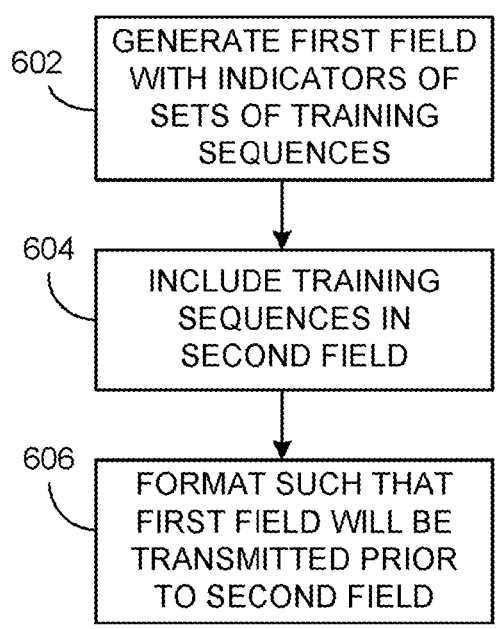
FIG. 20 is a flow chart of an example method for generating a preamble of a data unit for transmission via a MIMO communication channel, according to an embodiment.

FIG. 20 is a flow chart of an example method 600 for generating a preamble of a data unit for transmission via a multi-user MIMO (MU-MIMO) communication channel, according to an embodiment. The method 600 will be described with reference to various embodiments of the WLAN 10 and the data units 100, 200, and 300, for ease of explanation. It will be understood, however, that the method 600 is used in networks other than the WLAN 10, and/or is used to generate a preamble of a data unit other than the data units 100, 200, and 300, in some embodiments. Additionally, the PHY unit 20 is configured to perform the method 600, in an embodiment. However, it will be understood that other devices are configured to perform the method 600 in other embodiments. As just one example, the MAC unit 18 is configured to perform at least a portion of the method 600, in an embodiment. It will further be understood that the PHY unit 20 is configured to perform methods other than the method 600, in some embodiments.

At block 602, a first field of the preamble is generated. The first field of the preamble provides a plurality of indicators to a plurality of receivers. According to an embodiment, each indicator corresponds to one of the plurality of receivers, and each indicator indicates a set of a plurality of training sequences that corresponds to transmission of the data unit to the corresponding receiver. For example, the first field of the preamble provides an indicator to the client station 25-1 of a first set of the plurality of training sequences that corresponds to transmission of the data unit to the client station 25-1, in an embodiment. The first field of the preamble further provides an indication to the client station 25-2 of a second set of the plurality of training sequences that corresponds to transmission of the data unit to the client station 25-2, in an embodiment, and/or provides corresponding indicators of sets of the plurality of training sequences to the client stations 25-3, 25-4, etc., in some embodiments.

According to various embodiments, at least one of the indicators provided to the plurality of receivers includes an indication of a number of spatial streams corresponding to transmission of the data unit to the receiver; an indication of a number of space-time streams corresponding to transmission of the data unit to the receiver; an indication of a number of training fields corresponding to transmission of the data unit to the receiver; or any suitable indication of a position of a set of training sequences within, for example, the VHT-LTFs 130. In an embodiment, at least one of the indicators provided to one of the plurality of receivers is a further indicator of the set of the plurality of training sequences that corresponds to transmission of the data unit to another one of the plurality of receivers. Thus, for example, a second one of the plurality of receivers uses the indicator of the set of the plurality of training sequences that corresponds to transmission of the data unit to a first one of the plurality of receivers as a further indicator (i.e., in addition to the indicator that corresponds to the second receiver) of the set of the plurality of training sequences that corresponds to transmission of the data unit to the second receiver, in an embodiment. More specifically, in an embodiment, an indication of the number of spatial or space-time streams that corresponds to transmission of the data unit to the second receiver is an indicator of the set of the plurality of training sequences that corresponds to transmission of the data unit to the second receiver. Additionally, an indication of the number of spatial or space-time streams that corresponds to transmission of the data unit to the first receiver is a further indicator of the set of the plurality of training sequences that corresponds to transmission of the data unit to the second receiver.

Unique index values are used to indicate the order in which the plurality of indicators of the sets of the plurality of training sequences will be provided to the plurality of receivers, in some embodiments. For example, each unique index value corresponds to one of the plurality of receivers, in an embodiment. For example, the unique index value corresponding to the client station 25-1 indicates the position or order of a subfield of the first field of the preamble, relative to other subfields of the first field of the preamble, which corresponds to the client station 25-1. The subfield which corresponds to the client station 25-1, in turn, includes an indication of a number of spatial or space-time streams corresponding to transmission of the data unit to the client station 25-1, or another suitable indication of the set of the plurality of training sequences which corresponds to the client station 25-1, according to an embodiment. Other unique index values may be used in similar ways for other ones of the plurality of receivers, such as the client station 25-2, the client station 25-3, etc. The unique index values are therefore used to indicate the locations of sets of the plurality of training sequences within the VHT-LTFs 130, according to an embodiment.

At block 604, the plurality of training sequences is included in a second field of the preamble.

At block 606, the preamble is formatted such that the first field of the preamble will be transmitted prior to the second field of the preamble being transmitted. Accordingly, each of the plurality of receivers receives an indication of a set of the plurality of training sequences that corresponds to transmission of the data unit to the receiver before receiving the VHT-LTFs 130, according to an embodiment.

One of ordinary skill in the art will recognize suitable variations of the method 600 in light of the teaching and disclosure herein. For example, in some embodiments, one or more features shown in FIG. 20 are not performed, and/or one or more additional features not shown in FIG. 20 are performed. In another example, the order shown in FIG. 20 does not indicate the order in which the method 600 is performed, and/or does not indicate that each block is completed before another block begins.

Figure 21:
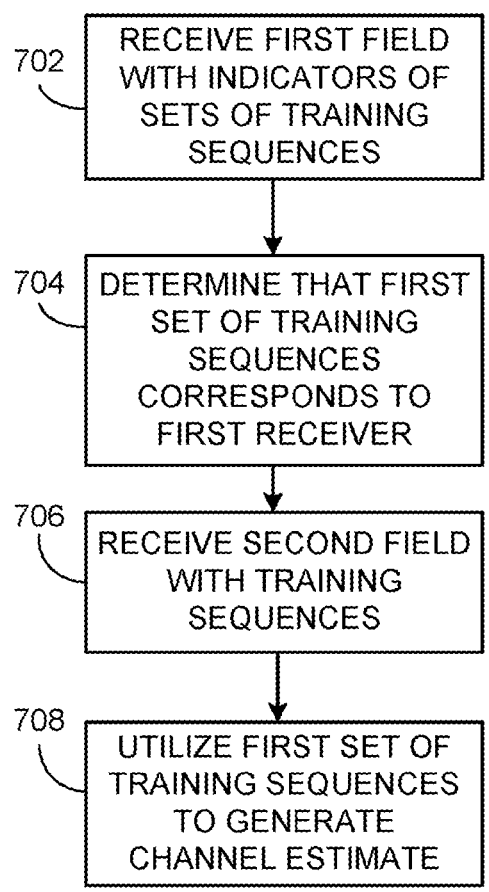
FIG. 21 is a flow chart of an example method for receiving a preamble of a data unit via a MIMO communication channel, according to an embodiment.

FIG. 21 is a flow chart of an example method 700 for receiving a preamble of a data unit via a multi-user MIMO (MU-MIMO) communication channel using a first receiver, such as using the PHY unit 29 of the client station 25-1, according to an embodiment. The method 700 will be described with reference to various embodiments of the WLAN 10 and the data units 100, 200, and 300, for ease of explanation. It will be understood, however, that the method 700 is used in networks other than the WLAN 10, and/or is used to receive a preamble of a data unit other than the data units 100, 200, and 300, in some embodiments. Additionally, the PHY unit 29 is configured to perform the method 700, in an embodiment. However, it will be understood that other devices are configured to perform the method 700 in other embodiments. It will further be understood that the PHY unit 29 is configured to perform methods other than the method 700, in some embodiments.

At block 702, a first field of the preamble is received. The first field provides a plurality of indicators to a plurality of receivers. The plurality of receivers includes the first receiver, e.g., the client station 25-1, in an embodiment. According to an embodiment, each indicator corresponds to one of the plurality of receivers, and each indicator indicates a set of a plurality of training sequences that corresponds to transmission of the data unit to the corresponding receiver. For example, the first field of the preamble provides an indicator to the client station 25-1 of a first set of the plurality of training sequences that corresponds to transmission of the data unit to the client station 25-1, in an embodiment. The first field of the preamble further provides an indicator to the client station 25-2 of a second set of the plurality of training sequences that corresponds to transmission of the data unit to the client station 25-2, in an embodiment, and/or provides corresponding indicators of sets of the plurality of training sequences to the client stations 25-3, 25-4, etc., in some embodiments.

As described with respect to the method 600, in various embodiments, the indicator that corresponds to the first receiver includes an indication of a number of spatial streams corresponding to transmission of the data unit to the first receiver; an indication of a number of space-time streams corresponding to transmission of the data unit to the first receiver; an indication of a number of training fields corresponding to transmission of the data unit to the first receiver; or any suitable indication of a position of a set of training sequences within, for example, the VHT-LTFs 130, that corresponds to transmission of the data unit to the first receiver. In an embodiment, a second one of the plurality of indicators that corresponds to a second one of the plurality of receivers is a further indicator of the set of the plurality of training sequences that corresponds to transmission of the data unit to the first receiver, in addition to the indicator that corresponds to the first receiver. For example, in an embodiment, an indication of the number of spatial or space-time streams that corresponds to transmission of the data unit to the first receiver is an indicator of the set of the plurality of training sequences that corresponds to transmission of the data unit to the first receiver. Additionally, an indication of the number of spatial or space-time streams that corresponds to transmission of the data unit to the second receiver is a further indicator of the set of the plurality of training sequences that corresponds to transmission of the data unit to the first receiver.

Additionally, unique index values are used to indicate the order in which the plurality of indicators of the sets of the plurality of training sequences will be provided to the plurality of receivers, in some embodiments. For example, each unique index value corresponds to one of the plurality of receivers, in an embodiment. For example, the unique index value corresponding to the client station 25-1 indicates the position or order of a subfield of the first field of the preamble, relative to other subfields of the first field of the preamble, which corresponds to the client station 25-1. The subfield which corresponds to the client station 25-1, in turn, includes an indication of a number of spatial or space-time streams corresponding to transmission of the data unit to the client station 25-1, or another suitable indication of the set of the plurality of training sequences which corresponds to the client station 25-1, according to an embodiment. Other unique index values may be used in similar ways for other ones of the plurality of receivers, such as the client station 25-2, the client station 25-3, etc. The client station 25-1 therefore receives its unique index value and uses its unique index value to determine the location of the set of the plurality of training sequences within the VHT-LTFs 130 that corresponds to the client station 25-1, as described above, according to an embodiment.

At block 704, it is determined, based on the indicator to the first receiver that is received at block 702, that a first set of the plurality of training sequences corresponds to the first receiver. The determination at block 704 is made in any of various suitable ways, such as in one of the example ways described above, according to various embodiments. In some embodiments, where a second one of the plurality of indicators that corresponds to a second one of the plurality of receivers is a further indicator of the set of the plurality of training sequences that corresponds to transmission of the data unit to the first receiver, the determination at block 704 is made further based on the second one of the plurality of indicators.

At block 706, a second field of the preamble is received. The second field of the preamble includes the plurality of training sequences. Therefore, based on the result of block 704, the client station 25-1 already knows, upon receiving at least some of the VHT-LTFs 130, which ones of the VHT-LTFs 130 correspond to the client station 25-1, according to an embodiment.

At block 708, the first set of training sequences is utilized to generate an estimate of at least a portion of the communication channel between a transmitter, such as the AP 14, and the first receiver, such as the client station 25-1. In an embodiment, at least a portion of block 708 is performed while performing block 706. Accordingly, the method 700 allows the communication channel to be estimated earlier by virtue of providing a way to determine that the first set of training sequences corresponds to the first receiver, before receiving at least some of the training sequences, in an embodiment.

One of ordinary skill in the art will recognize suitable variations of the method 700 in light of the teaching and disclosure herein. For example, in some embodiments, one or more features shown in FIG. 21 are not performed, and/or one or more additional features not shown in FIG. 21 are performed. In another example, the order shown in FIG. 21 does not indicate the order in which the method 700 is performed, and/or does not indicate that each block is completed before another block begins.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

The invention claimed is:

1. A non-transitory computer-readable medium having processor-executable instructions stored thereon, wherein the processor-executable instructions, when executed, facilitate:
   generating a data unit having a preamble and a data portion, wherein the preamble of the data unit includes a plurality of training sequences, a first field, and a second field, wherein the preamble is structured such that i) the first field precedes the plurality of training sequences, and ii) the plurality of training sequences precedes the second field; and
   transmitting the data unit;
   wherein the preamble comprises an indication of whether the data unit is a multi-user data unit or a single-user data unit;
   wherein the indication indicates that the data unit is a multi-user data unit, wherein the first field of the preamble includes a plurality of indications of respective numbers of streams for a plurality of receivers, and wherein the second field of the preamble includes respective modulation and coding scheme information for the plurality of receivers;
   wherein the plurality of receivers includes a first receiver and a second receiver;
   wherein the plurality of indications of respective numbers of streams includes a first indication of a first number of spatial or space-time streams in a first sub-field of the first field of the preamble and a second indication of a second number of spatial or space-time streams in a second sub-field of the first field of the preamble; and
   wherein the first field is formatted such that a position of the first sub-field indicates that the first sub-field corresponds to a first index value and a position of the second sub-field indicates that the second sub-field corresponds to a second index value.

2. The non-transitory computer-readable medium according to claim 1, wherein the plurality of indications of the respective numbers of streams for the plurality of receivers enables each respective receiver to determine a respective set of one or more streams in the plurality of training sequences.

3. The non-transitory computer-readable medium according to claim 1, wherein the data portion of the data unit includes data for the plurality of receivers and is transmitted using respective modulation and coding schemes for the plurality of receivers.

4. The non-transitory computer-readable medium according to claim 1, wherein transmitting the data unit further comprises:
   transmitting the first field of the preamble in an omni-directional mode; and
   respectively beam-steering the second field of the preamble to respective receivers of the plurality of receivers.

5. The non-transitory computer-readable medium according to claim 4, wherein transmitting the data unit further comprises:

respectively beam-steering respective sets of one or more training sequences to the respective receivers.

6. The non-transitory computer-readable medium according to claim 1, wherein the preamble includes a plurality of bits which are configurable, for a single-user data unit, to indicate an identifier of a single receiver, and for a multi-user data unit, to indicate numbers of streams for the plurality of receivers.

7. The non-transitory computer-readable medium according to claim 1, wherein the preamble includes a plurality of bits which are configurable, for a single-user data unit, to indicate a partial association identifier (AID) of a single receiver, and for a multi-user data unit, to indicate numbers of streams for the plurality of receivers.

8. The non-transitory computer-readable medium according to claim 1, wherein the preamble includes a plurality of bits which are configurable, for a single-user data unit, to indicate a number of streams for a single receiver and an identifier of the single receiver, and for a multi-user data unit, to indicate a plurality of indications of respective numbers of streams for the plurality of receivers.

9. The non-transitory computer-readable medium according to claim 1, wherein the indication of whether the multi-user data unit is a multi-user data unit or a single-user data unit is part of the first field of the preamble.

10. The non-transitory computer-readable medium according to claim 9, wherein the first field of the preamble comprises a plurality of bits for indicating a group number.

11. The non-transitory computer-readable medium according to claim 10, wherein the plurality of bits for indicating the group number also indicates whether the multi-user data unit is a multi-user data unit or a single-user data unit.

12. The non-transitory computer-readable medium according to claim 1, wherein the data unit is transmitted via a multiple input multiple output (MIMO) communication channel.

13. The non-transitory computer-readable medium according to claim 1, wherein the plurality of indications of respective numbers of streams are ordered according to an order.

14. The non-transitory computer-readable medium according to claim 13, wherein the processor-executable instructions, when executed, further facilitate:
generating another data unit that includes information indicating the order, wherein the other data unit is transmitted prior to the first field of the preamble being transmitted.

15. An apparatus comprising a processor and a non-transitory medium having processor-executable instructions stored thereon, wherein the processor-executable instructions, when executed by the processor, facilitate:
generating a data unit having a preamble and a data portion, wherein the preamble of the data unit includes a plurality of training sequences, a first field, and a second field, wherein the preamble is structured such that i) the first field precedes the plurality of training sequences, and ii) the plurality of training sequences precedes the second field; and
transmitting the data unit;
wherein the preamble comprises an indication of whether the data unit is a multi-user data unit or a single-user data unit;
wherein the indication indicates that the data unit is a multi-user data unit, wherein the first field of the preamble includes a plurality of indications of respective numbers of streams for a plurality of receivers, and wherein the second field of the preamble includes respective modulation and coding scheme information for the plurality of receivers;
wherein the plurality of receivers includes a first receiver and a second receiver;
wherein the plurality of indications of respective numbers of streams includes a first indication of a first number of spatial or space-time streams in a first sub-field of the first field of the preamble and a second indication of a second number of spatial or space-time streams in a second sub-field of the first field of the preamble; and
wherein the first field is formatted such that a position of the first sub-field indicates that the first sub-field corresponds to a first index value and a position of the second sub-field indicates that the second sub-field corresponds to a second index value.

16. A method, comprising:
generating, by a communication device, a data unit having a preamble and a data portion, wherein the preamble of the data unit includes a plurality of training sequences, a first field, and a second field, wherein the preamble is structured such that i) the first field precedes the plurality of training sequences, and ii) the plurality of training sequences precedes the second field; and
transmitting, by the communication device, the data unit;
wherein the preamble comprises an indication of whether the data unit is a multi-user data unit or a single-user data unit;
wherein the indication indicates that the data unit is a multi-user data unit, wherein the first field of the preamble includes a plurality of indications of respective numbers of streams for a plurality of receivers, and wherein the second field of the preamble includes respective modulation and coding scheme information for the plurality of receivers;
wherein the plurality of receivers includes a first receiver and a second receiver;
wherein the plurality of indications of respective numbers of streams includes a first indication of a first number of spatial or space-time streams in a first sub-field of the first field of the preamble and a second indication of a second number of spatial or space-time streams in a second sub-field of the first field of the preamble; and
wherein the first field is formatted such that a position of the first sub-field indicates that the first sub-field corresponds to a first index value and a position of the second sub-field indicates that the second sub-field corresponds to a second index value.

* * * * *